United States Patent
Hirohata et al.

(10) Patent No.: US 10,484,559 B2
(45) Date of Patent: Nov. 19, 2019

(54) CONTROL DEVICE FOR CONTROLLING IMAGE PROCESSING SYSTEM, IMAGE FORMING APPARATUS, IMAGE READING APPARATUS, CONTROL METHOD, AND COMPUTER-READABLE RECORDING MEDIUM

(71) Applicant: Sharp Kabushiki Kaisha, Osaka (JP)

(72) Inventors: Hitoshi Hirohata, Osaka (JP); Naoto Fukushima, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 40 days.

(21) Appl. No.: 14/470,089

(22) Filed: Aug. 27, 2014

(65) Prior Publication Data

US 2015/0009541 A1  Jan. 8, 2015

Related U.S. Application Data

(63) Continuation of application No. 13/292,253, filed on Nov. 9, 2011, now Pat. No. 8,854,641.

(30) Foreign Application Priority Data

Nov. 12, 2010  (JP) ................................ 2010-254295

(51) Int. Cl.
*H04N 1/00* (2006.01)
*H04N 1/203* (2006.01)
*H04N 1/38* (2006.01)

(52) U.S. Cl.
CPC ..... *H04N 1/00801* (2013.01); *H04N 1/00474* (2013.01); *H04N 1/00482* (2013.01);
(Continued)

(58) Field of Classification Search
CPC .......... H04N 1/00411; H04N 1/00416; H04N 1/00432; H04N 1/387; G06K 9/00442; G06T 11/001; G06F 3/1211
(Continued)

(56) References Cited

U.S. PATENT DOCUMENTS 4,755,877 A * 7/1988 Vollert ................ H04N 1/0057
346/104
5,012,932 A * 5/1991 Omura ................... G07D 11/50
209/534

(Continued)

FOREIGN PATENT DOCUMENTS

CN 101521709 A 9/2009
JP 04-086759 A 3/1992
(Continued)

OTHER PUBLICATIONS

Co-pending U.S. Appl. No. 13/292,253, filed Nov. 9, 2011.

*Primary Examiner* — Akwasi M Sarpong
(74) *Attorney, Agent, or Firm* — Renner, Otto, Boisselle & Sklar, LLP

(57) ABSTRACT

An image forming apparatus 10a includes (i) an image input apparatus 1, (ii) a control section 5a, (iii) a document detecting section 24 including a blank page detecting section and a separator sheet detecting section, and (iv) a file creating section 31 for creating a file of image data. The image input apparatus 1 has a double-side reading function. The file creating section 31 has a blank page skipping function and a separating function. The control section 5a includes a function setting section 51 for enabling the double-side reading function and the blank page skipping function when enabling the separating function.

15 Claims, 19 Drawing Sheets

(52) U.S. Cl.
CPC ..... *H04N 1/00724* (2013.01); *H04N 1/00803* (2013.01); *H04N 1/2032* (2013.01); *H04N 1/38* (2013.01); *H04N 2201/0094* (2013.01)

(58) Field of Classification Search
USPC ................ 358/464, 1.4, 1.7, 2.1, 1.13, 401; 271/259, 279, 265.02
See application file for complete search history.

(56) References Cited

U.S. PATENT DOCUMENTS

| | | | | |
|---|---|---|---|---|
| 5,138,674 | A * | 8/1992 | Sugawa | H04N 1/00795 358/464 |
| 5,282,026 | A * | 1/1994 | Nagata | H04N 1/56 345/589 |
| 5,316,279 | A * | 5/1994 | Corona | B65H 31/10 270/1.01 |
| 6,228,657 | B1 * | 5/2001 | Genovese | G01N 1/2273 422/400 |
| 6,985,245 | B1 * | 1/2006 | Takahashi | G06K 15/00 358/1.11 |
| 7,245,740 | B2 * | 7/2007 | Suzaki | G06T 1/0028 358/3.28 |
| 8,699,042 | B2 * | 4/2014 | Nordback | G06T 11/001 345/592 |
| 8,717,626 | B2 * | 5/2014 | Severens | H04N 1/56 358/1.13 |
| 8,724,190 | B2 * | 5/2014 | Kitayama | H04N 1/00623 271/258.01 |
| 9,189,713 | B2 * | 11/2015 | Kurose | G06K 15/1848 |
| 2005/0060059 | A1 * | 3/2005 | Klein | G07D 11/20 700/213 |
| 2006/0022402 | A1 * | 2/2006 | Fujii | B65H 29/62 271/279 |
| 2007/0103702 | A1 * | 5/2007 | Yamamoto | G03G 15/0194 358/1.4 |
| 2008/0049264 | A1 * | 2/2008 | Morimoto | G06K 9/00442 358/464 |
| 2008/0231890 | A1 * | 9/2008 | Kishi | G06F 21/608 358/1.15 |
| 2009/0213409 | A1 * | 8/2009 | Arifuku | H04N 1/00413 358/1.13 |
| 2010/0053682 | A1 * | 3/2010 | Gotoh | H04N 1/00411 358/1.15 |
| 2011/0196678 | A1 * | 8/2011 | Hanazawa | G10L 15/1807 704/251 |
| 2011/0304092 | A1 * | 12/2011 | Kambayashi | B65H 3/0684 271/4.02 |
| 2012/0119436 | A1 * | 5/2012 | Morita | B65H 7/14 271/259 |
| 2012/0120432 | A1 * | 5/2012 | Hirohata | H04N 1/00474 358/1.13 |

FOREIGN PATENT DOCUMENTS

| | | |
|---|---|---|
| JP | 4-282968 A | 10/1992 |
| JP | 6-189083 A | 7/1994 |
| JP | 08-088704 | 4/1996 |
| JP | 2002-218232 A | 8/2002 |
| JP | 2002-232708 A | 8/2002 |
| JP | 2004-064222 A | 2/2004 |
| JP | 2008-077641 A | 4/2008 |
| JP | 2010-021845 A | 1/2010 |
| JP | 2010-056803 A | 3/2010 |
| JP | 2010-093406 A | 4/2010 |

* cited by examiner

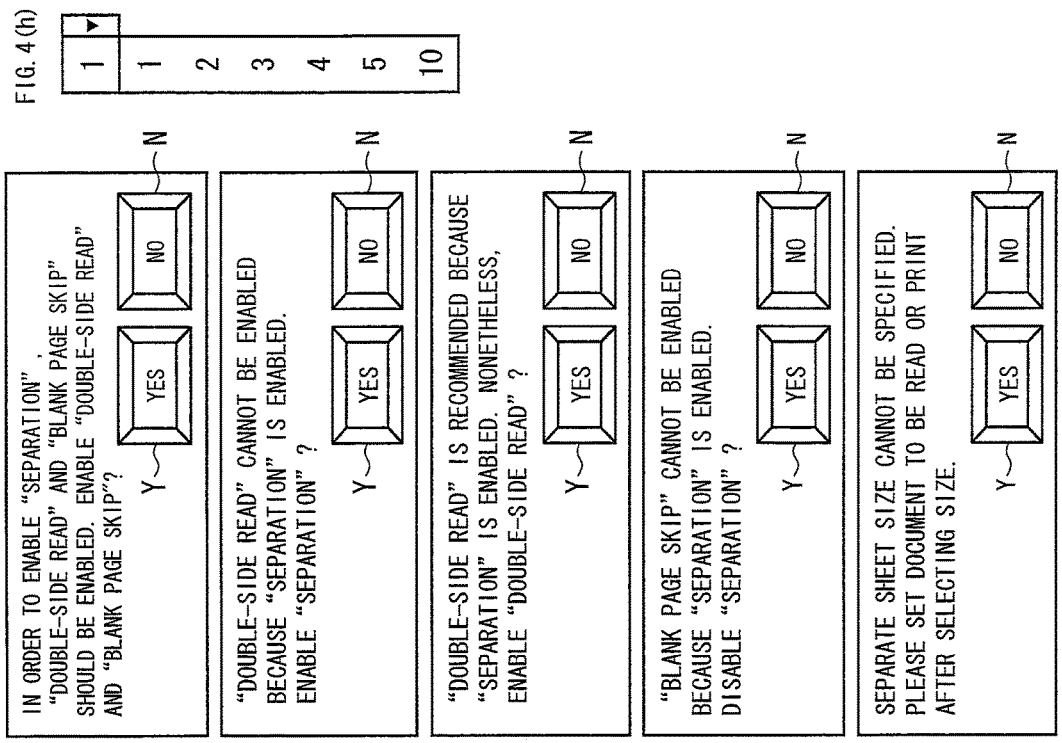
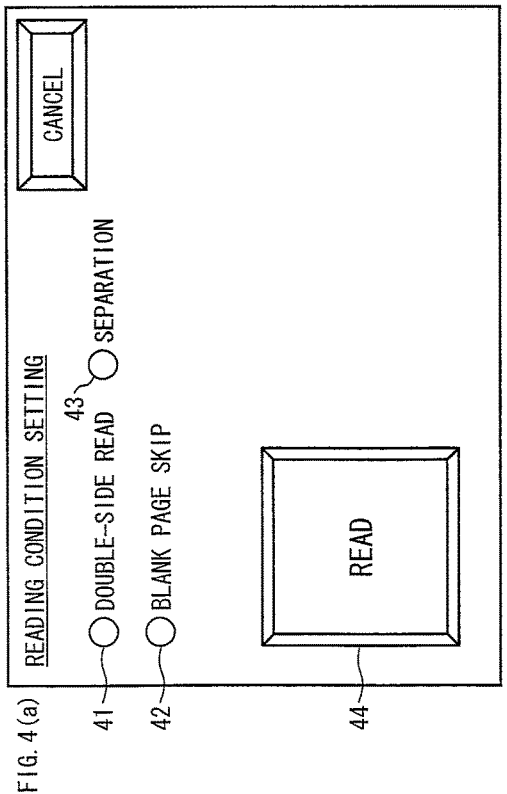
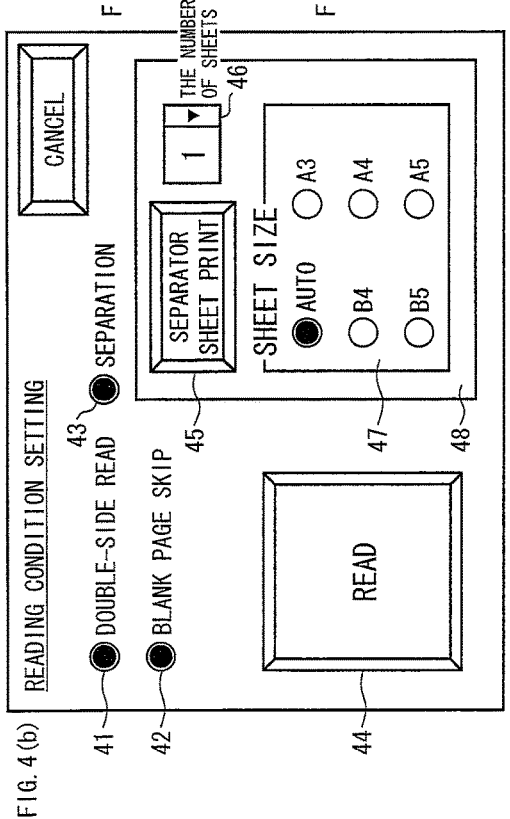

PATCH

MATCHING REGION

BARCODE

IDENTIFICATION REGION

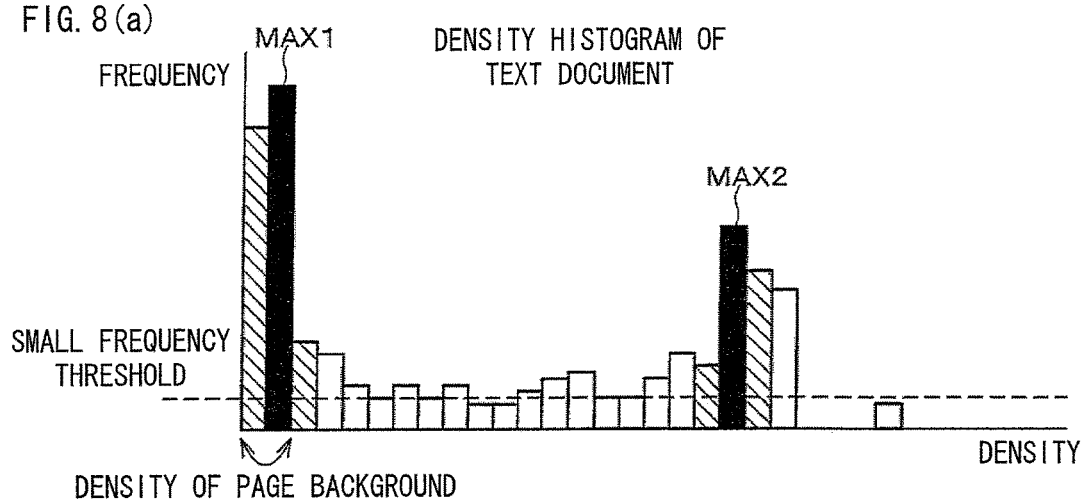
FIG. 8(a) DENSITY HISTOGRAM OF TEXT DOCUMENT
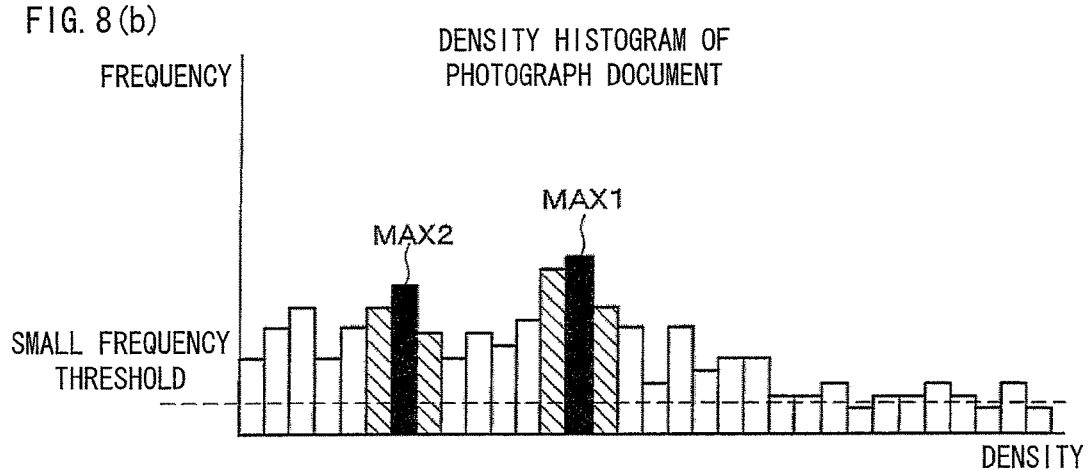
FIG. 8(b) DENSITY HISTOGRAM OF PHOTOGRAPH DOCUMENT
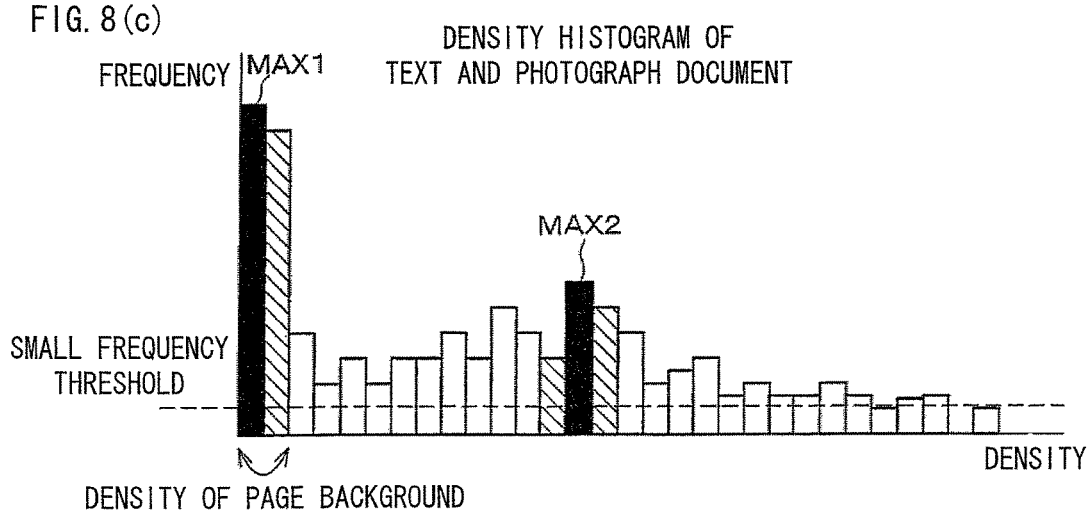
FIG. 8(c) DENSITY HISTOGRAM OF TEXT AND PHOTOGRAPH DOCUMENT F I G. 1 7 (a)
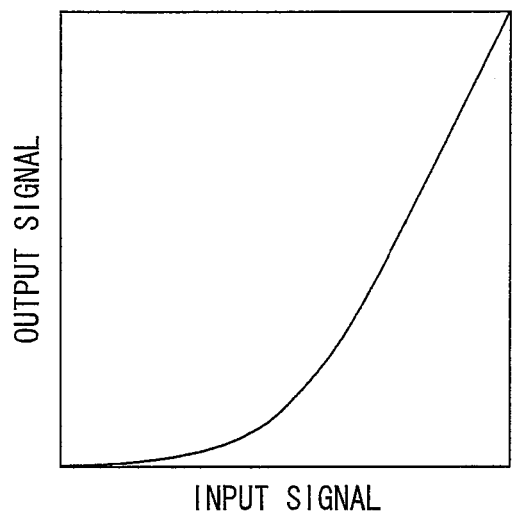
F I G. 1 7 (b)
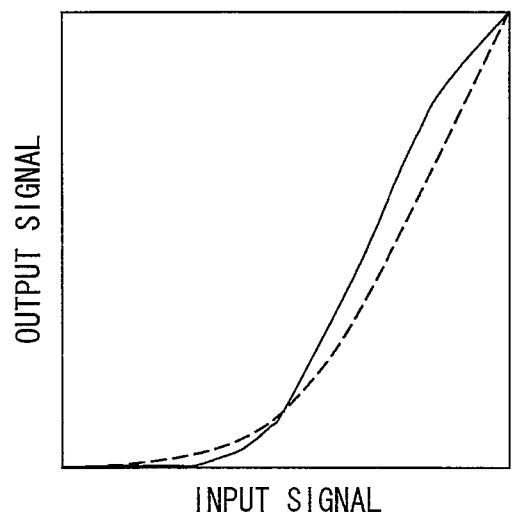

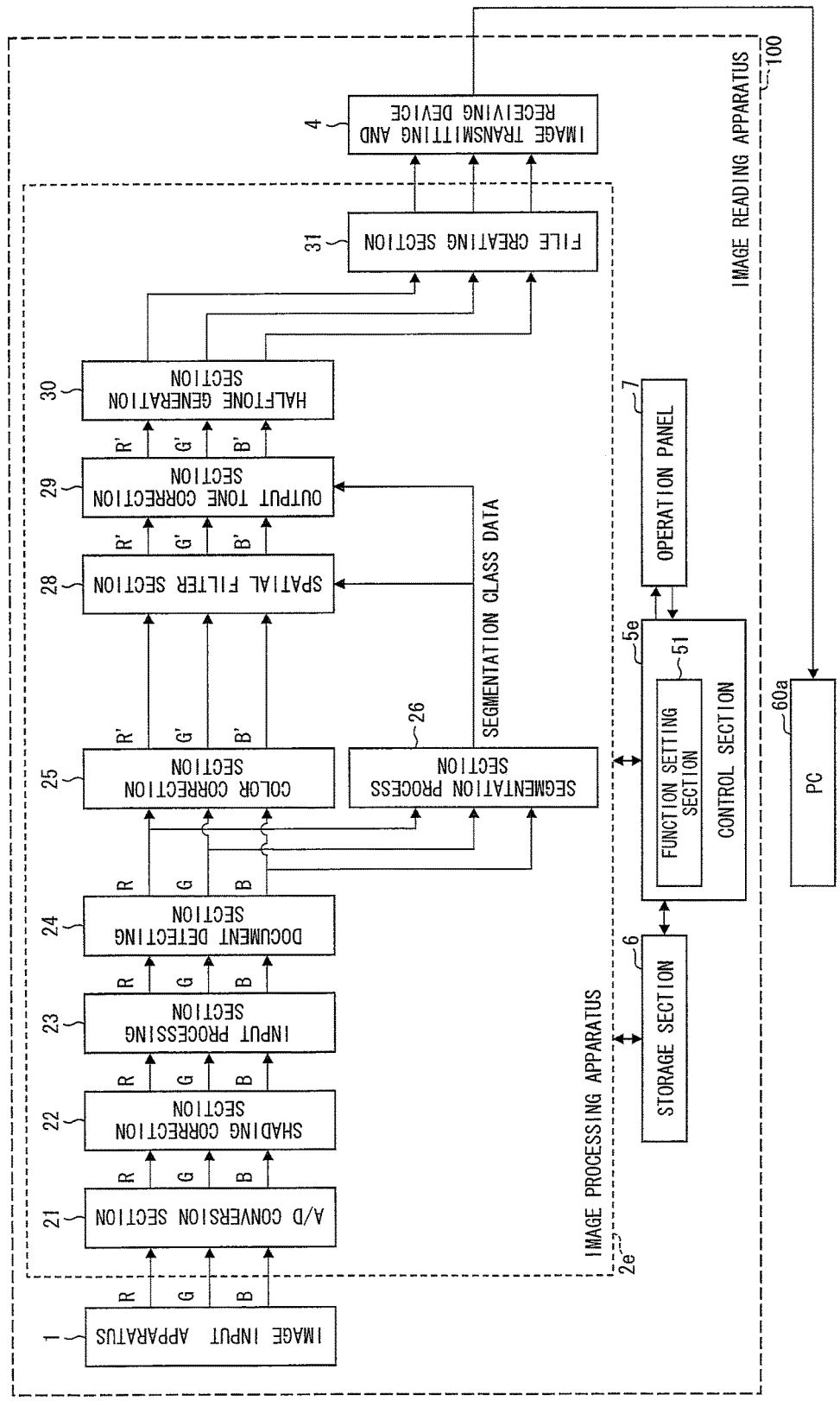

F I G. 1 9 (a)
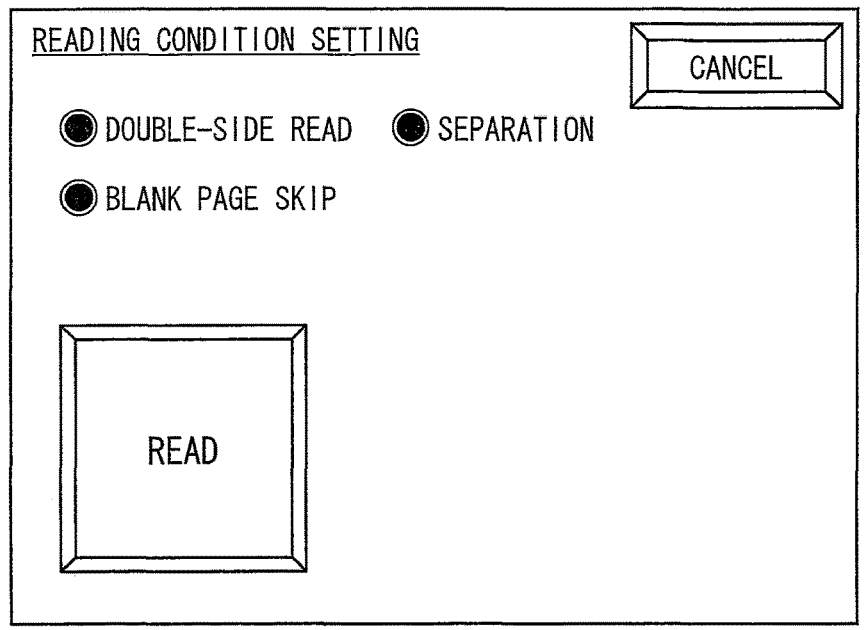
F I G 1 9 (b)
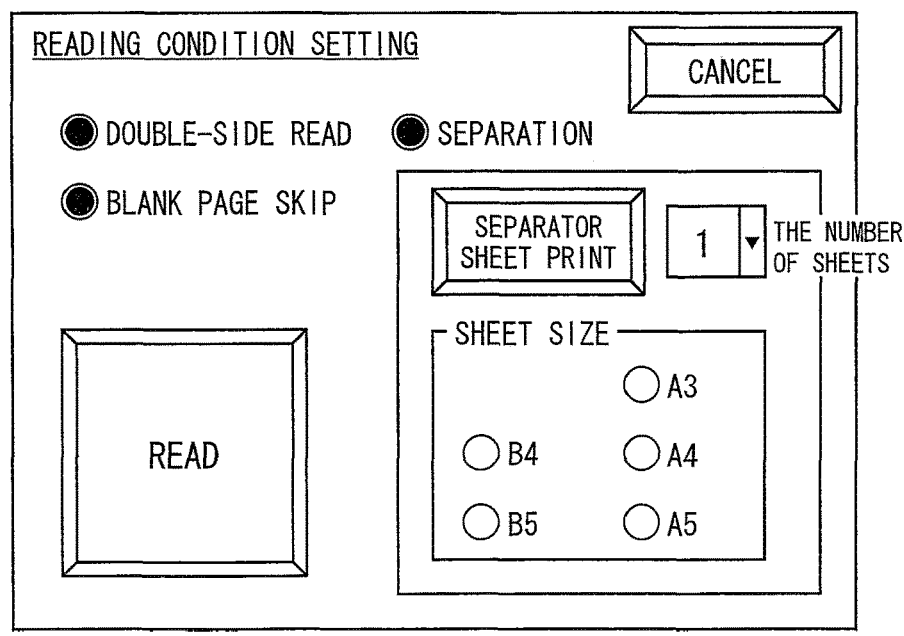

CONTROL DEVICE FOR CONTROLLING IMAGE PROCESSING SYSTEM, IMAGE FORMING APPARATUS, IMAGE READING APPARATUS, CONTROL METHOD, AND COMPUTER-READABLE RECORDING MEDIUM

This Nonprovisional application claims priority under 35 U.S.C. § 119(a) on Patent Application No. 2010-254295 filed in Japan on Nov. 12, 2010, the entire contents of which are hereby incorporated by reference.

TECHNICAL FIELD

The present invention relates to (i) a control device for controlling an image processing system that (a) detects interleaving papers from a plurality of bundles of documents, each of which bundles is made up of at least one document and which bundles are stacked so that an interleaving paper is placed between any two adjacent ones of the plurality of bundles and (b) carries out an output process with respect to each of the bundles of documents, (ii) an image forming apparatus including the control device, (iii) an image reading apparatus, (iv) a control method, (v) a computer-readable recording medium.

BACKGROUND ART

There has been known an image forming apparatus such as a copying machine or a multifunction peripheral that has a function of (i) detecting interleaving papers from a plurality of bundles of documents, each of which bundles is made up of at least one document and which bundles are stacked so that an interleaving paper is placed between any two adjacent ones of the plurality of bundles and (ii) carries out an output process with respect to each of the bundles of documents, that is, a separating function. For example, Patent Literature 1 discloses the following technique. In a case where (i) an interleaving paper is detected in a double-side copying mode and (ii) the number of documents which is counted just before a detected interleaving paper is odd, recording papers, in a duplex tray, whose surfaces have already been printed are discharged with no print on the other of the surfaces, and then each of documents, placed under the interleaving paper, are subjected to a process to be carried out in the double-side copying mode. Note that, in a case an interleaving paper detecting mode is selected, it is determined whether or not each document is blank, and an interleaving paper is detected when a document has been determined to be blank.

A technique disclosed in Patent Literature 1 makes it possible to carry out double-side copy for individual groups of documents without copying, on both surfaces of a single recording paper, the last page of a group of odd-numbered single-side printed documents (a bundle of documents) and the first page of a subsequent group of documents. That is, according to the technique disclosed in Patent Literature 1, in a case where an interleaving paper is detected, a recording paper whose single side has been copied and whose other side has not been copied is discharged (outputted), and therefore the first page of the group of documents following the interleaving paper is inevitably copied on a surface of another recording paper.

CITATION LIST

Patent Literature

Patent Literature 1
Japanese Patent Application Publication, Tokukaihei No. 4-86759 A (Publication Date: Mar. 19, 1992)

Patent Literature 2
Japanese Patent Application Publication, Tokukai No. 2010-56803 A (Publication Date: Mar. 11, 2010)

Patent Literature 3
Japanese Patent Application Publication, Tokukaihei No. 4-282968 A (Publication Date: Oct. 8, 1992)

Patent Literature 4
Japanese Patent Application Publication, Tokukai No. 2002-218232 A (Publication Date: Aug. 2, 2002)

Patent Literature 5
Japanese Patent Application Publication, Tokukai No. 2002-232708 A (Publication Date: Aug. 16, 2002)

Patent Literature 6
Japanese Patent Application Publication, Tokukaihei No. 6-189083 A (Publication Date: Jul. 8, 1994)

Patent Literature 7
Japanese Patent Application Publication, Tokukai No. 2008-77641 A (Publication Date: Apr. 3, 2008)

Patent Literature 8
Japanese Patent Application Publication, Tokukai No. 2010-93406 A (Publication Date: Apr. 22, 2010)

SUMMARY OF INVENTION

Technical Problem

However, the technique disclosed in Patent Literature 1 has a single-side reading method, and is therefore employed in a case of a bundle of documents each of which is a single-sided document having information on merely one surface of the document. As such, the technique cannot deal with a bundle of documents each of which is made up of a single-sided document and a double-sided document having information on both surfaces of the document. Even in a case where the technique applies to a double-sided reading method, a surface of the single-sided document which surface has no information (a white (blank) page of a back side (rear side)) cannot be distinguished from an interleaving paper (blank page) by the technique. Therefore, an expected operation cannot be attained by the technique.

The present invention was made in view of the problem, and an object of the present invention is to provide devices such as a control device capable of carrying out an output process with respect to each bundle of documents, without (i) missing any information of the documents and (ii) carrying out setting of each bundle of documents as to whether each document is a single-sided document or a double-sided document, even in a case where a plurality of bundles of documents each of which bundles is made up of a single-sided document(s) and a double-sided document(s) are continuously read.

Solution to Problem

In order to attain the object, a control device of the present invention is a control device for controlling an image processing system, the image processing system including: an image input section, which (i) is capable of continuously reading documents from a plurality of bundles of documents which bundles are stacked so that an interleaving paper is placed between any adjacent ones of the plurality of bundles, each of which bundles is made up of at least one document and (ii) creates image data of each of read documents; a blank document determining section for determining whether or not the image data created by the image input section is blank document data; an interleaving paper detecting section for detecting image data of the interleaving paper from the image data created by the image input section; and an output section for carrying out an output process with respect to the image data created by the image input section, the image input section having a double-side reading function of reading double sides of each of the documents and then creating image data of each of the double sides, the output section having (i) a blank page skipping function of causing the blank document data determined by the blank document determining section not to be subjected to the output process and (ii) a separating function of carrying out the output process with respect to each image data of a bundle of documents separated by the image data of the interleaving paper detected by the interleaving paper detecting section, said control device including a function setting section for enabling the double-side reading function and the blank page skipping function when enabling the separating function.

Advantageous Effects of Invention

According to the configuration, the double-side reading function and the blank page skipping function are enabled when the separating function is enabled. Accordingly, by enabling the separating function, documents are read, and image data of the documents is created while the double-side reading function is being enabled, and the output process is carried out with respect to the image data while the blank page skipping function and the separating function are being enabled.

It is possible to carry out the output process while preventing information of each of all the documents from being missing, by enabling the double-side scanning function, even in a case where a plurality of bundles of documents are made up of (i) a plurality of bundles each of which is made up of single-sided documents each having information on its one side, (ii) a plurality of bundles in each of which a single-sided document(s) and a double-sided document(s) each having information on its both sides are mixed or (iii) a plurality of bundles of single-sided documents some of which bundles include a single-sided document(s) which is(are) back to front. This is because all documents are read and image data of the all documents are created, by enabling the double-side reading function.

It is possible to make the image processing system to carry out the following operations merely by enabling the separating function, in case of carrying out an output process with respect to each of the plurality of bundles of documents that are stacked so that an interleaving paper is placed between any adjacent ones of the plurality of bundles of documents in each of which bundles (i) a single-sided document(s) and (ii) a double-sided document(s) each having information on its both sides are mixed (each of which bundles can be made up of merely single-sided documents, merely double-sided documents, or both single-sided document(s) and double-sided document(s)). Specifically, the merely enabling of the separating function allows the image processing system to (i) read both sides of each of the documents to create image data of the both sides, (ii) eliminate data corresponding to a surface (blank document) of each of the single-sided documents which surface has no information, and (iii) carry out the output process with respect to each of the plurality of bundles of documents. Note that the blank document (blank page or plain document) is a document that has no information thereon. That is, the blank document corresponds to a surface (back side (rear side)) of a single-sided document which surface has no information thereon or both surfaces of a document which surfaces have no information thereon.

The configuration makes it possible to carry out the output process with respect to each of the plurality of bundles of documents that are continuously read, while eliminating the data of the blank document, without any missing image data of the information of the documents, without carrying out a setting such as a setting for single-sided documents or a setting for double-sided documents, irrespective of documents of which each of the plurality of bundles is made up, and irrespective of single-sided documents, double-sided documents, and means by which the single-sided documents each having two faces are stacked in each of the plurality of bundles.

BRIEF DESCRIPTION OF DRAWINGS

FIGS. 4(a) and 4(b) are views showing an example of a screen for setting of reading conditions displayed on an operation panel.

FIGS. 4(c) through 4(f) are views showing an example of a screen displaying a message of enabling a separating function.

FIG. 4(g) is a view showing an example of a screen of a message of printing a separator sheet.

FIG. 4(h) is a view showing an example of a display on which the number of separator sheet to be printed is showed.

FIG. 8(a) is a view showing an example of a density (pixel value) histogram of a text page (document).

FIG. 8(b) is a view showing an example of a density (pixel value) histogram of a photograph page (document).

FIG. 8(c) is a view showing an example of a density (pixel value) histogram of a text and photograph page (document).

FIG. 17(a) is a view showing an example of a gamma curve in accordance with a display property of a display apparatus.

FIG. 17(b) is a view showing a solid gamma curve for clearly displaying texts and a dashed gamma curve in accordance with a display property of a display apparatus.

FIG. 18 is a block diagram showing an image reading apparatus in accordance with Embodiment 5, and a block diagram showing a flow of image data to be transmitted to an external apparatus, the image data having been subjected to a file creating process.

FIG. 19(a) is a view showing an example of a setting screen of a read condition displayed on an operation panel.

FIG. 19(b) is a view showing another example of a setting screen of a read condition displayed on an operation panel.

DESCRIPTION OF EMBODIMENTS

[Embodiment 1]
(Control Device and Image Processing System)

The following describes an embodiment of a control device of the present invention with reference to drawings. The control device of the present invention is a device for controlling an image processing system. In Embodiment 1, a control section 5a of an image forming apparatus 10a shown in FIG. 1 functions as the control device of the present invention, and the image processing system to be controlled is the image forming apparatus 10a. The following description will explain a configuration and a process employed when the control section (control device) 5a enables a separating function of the image forming apparatus (image processing system) 10a. Other configurations and processes are later described when the image forming apparatus 10a is described. The separating function represents a function of carrying out an output process with respect to each bundle (batch) of documents in a case where the documents are continuously read from a plurality of bundles of documents which bundles are stacked so that a separator sheet (interleaving paper) is placed between any adjacent ones of the plurality of bundles, each of which bundles is made up of at least one document.

Figure 1:
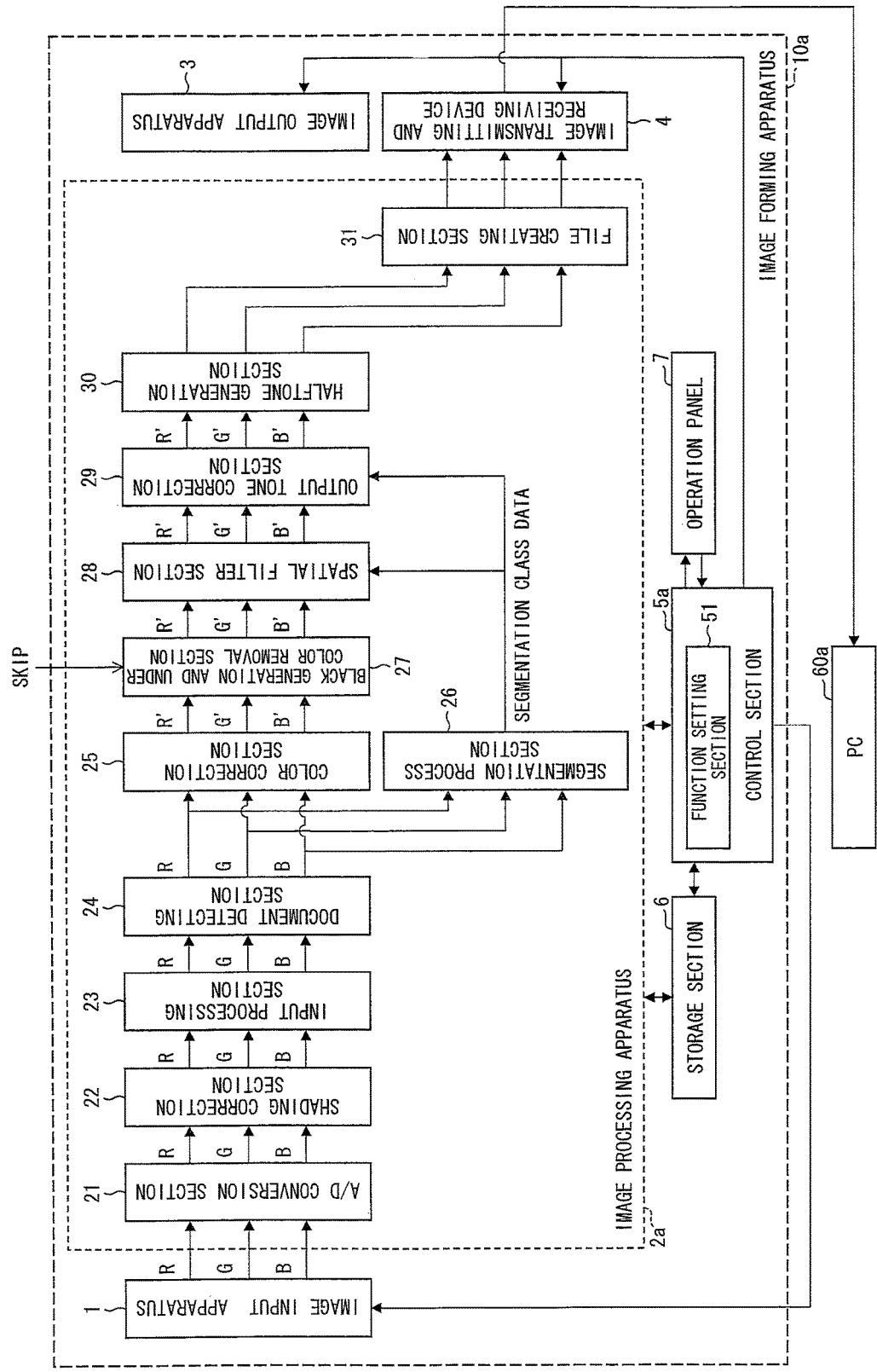
FIG. 1 is a block diagram of an image forming apparatus in accordance with Embodiment 1, and a block diagram showing a flow of image data to be transmitted to an external apparatus, the image data having been subjected to a file creating process.

As shown in FIG. 1, the image forming apparatus 10a includes an image input apparatus (image input section) 1, a document detecting section 24, and a file creating section (output section) 31.

The image input apparatus 1 is a block for reading a document and creating image data of the document that is read. The image input apparatus 1 is configured so as to continuously read documents from a plurality of bundles of documents which bundles are stacked so that a separator sheet (interleaving paper) is placed between any adjacent ones of the plurality of bundles, each of which bundles is made up of at least one document. The image input apparatus 1 has a double-side scanning function (double-side reading function) of reading both sides of a document and creating image data of the both sides of the document.

Figure 2:
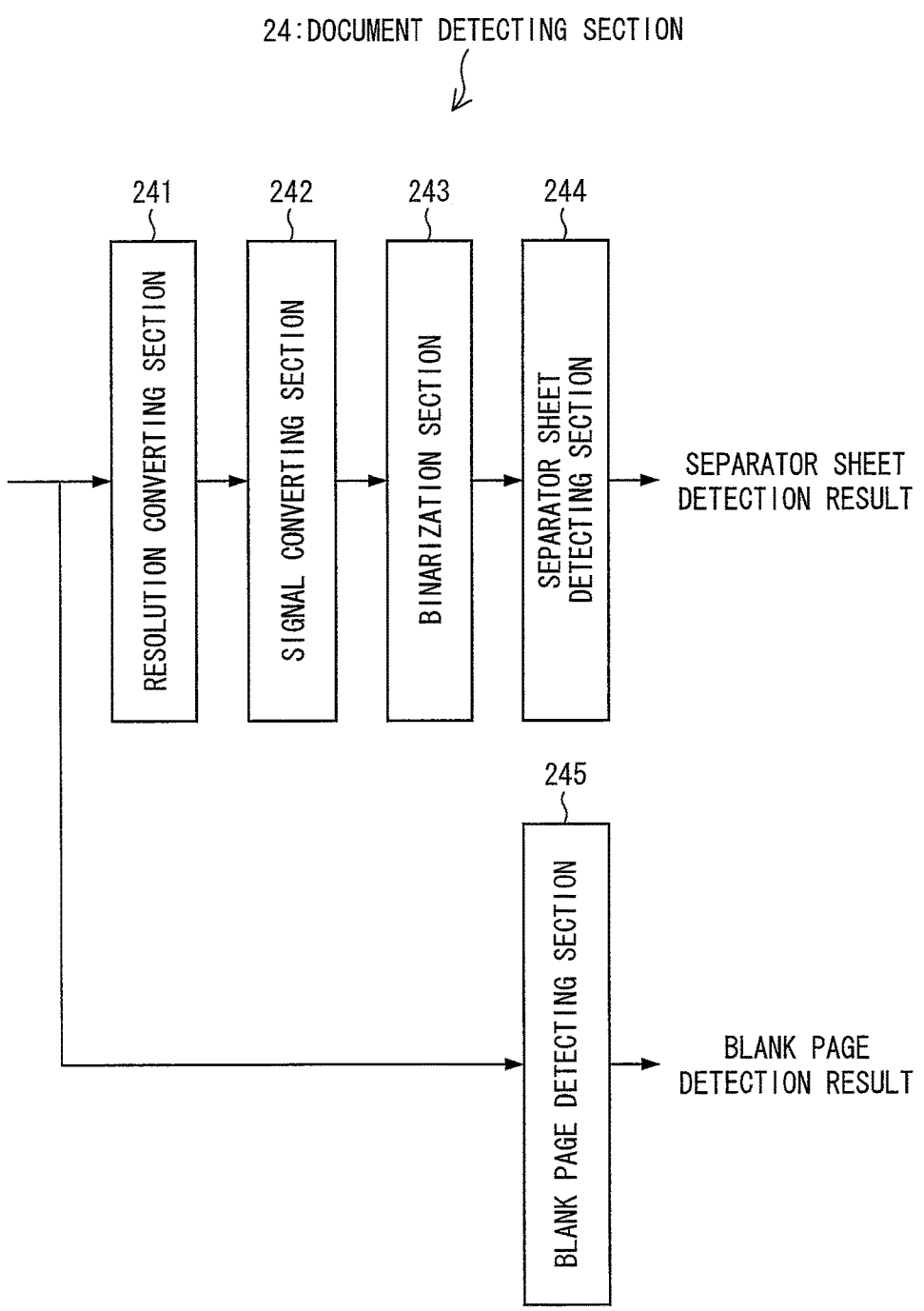
FIG. 2 is a block diagram showing a concrete configuration of a document detecting section included in the image forming apparatus in accordance with Embodiment 1.

The document detecting section 24 is a block for detecting image data of a separator sheet and image data of a blank page (a plain document, a blank document or a white document) in accordance with the image data created by the image input apparatus 1. As shown in FIG. 2, the document detecting section 24 includes a resolution converting section 241, a signal converting section 242, a binarization section 243, a separator sheet detecting section (interleaving paper detecting section) 244, and a blank page detecting section (blank document determining section) 245. The blank page represents a document that has no information. That is, the blank page corresponds to a surface (a back side (rear side)) of a single-sided document which surface has no information or both surfaces of a document which both surfaces have no information.

The resolution converting section 241 is a block for decreasing or increasing a resolution of image data. For example, the resolution converting section 241 converts a resolution of image data read at 1200 dpi or 600 dpi into 300 dpi. The resolution is converted by a conventionally well-known method such as a nearest neighbor method, a bi-linear method, a bi-cubic method or a mean value method. In this embodiment, it is assumed that image data having a resolution of 300 dpi is outputted so as to detect image data of a separator sheet.

The signal converting section 242 is a block for converting each of R, G and B color image data into a luminance signal (gray signal). The conversion is carried out based on, for example, the following expression (1).

$$Yi = 0.30 Ri + 0.59 Gi + 0.11 Bi \quad (1)$$

where "Y" indicates a luminance signal of a pixel, "R", "G" and "B" each indicate a value of a color component of a pixel, and a subscript "i" indicates a value given to each pixel ("i" is an integer of at least 1 (one)). Alternatively, each of R, G and B signals can be converted into a CIE1976L*a*b* signal (CIE: Commission International de l'Eclairage, L*: lightness, and a* and b*: chromaticity) or a G signal can be used.

The binarization section 243 binarizes the image data having a resolution of 300 dpi, which has been subjected to resolution conversion and converted into a luminance signal. In a case of 8-bit image data, for example, a threshold is set to 128. Alternatively, a threshold can be set to a mean value of a density (pixel value) of a block made up of a plurality of pixels (for example, 5×5 pixels).

The separator sheet detecting section 244 (i) compares, with image data of a separator sheet which image data is stored in the storage section 6, the image data of the document that has been read and created by the image input apparatus 1, and then (ii) determines whether or not the document read by the image input apparatus 1 is a separator sheet (detects a separator sheet). A method for detecting a separator sheet is later described.

The blank page detecting section 245 determines whether or not the image data created by the image input apparatus 1 is data of a blank page (detects whether or not the image data is a blank page). A method for determining a blank page is later described.

The file creating section (output section) 31 is a block for carrying out the file creating process (output process) for creating a file of the image data which is created by the image input apparatus 1 and is then subjected to an image process in an image processing apparatus 2a. The file creating section (output section) 31 has (i) a blank page skipping function (blank page skipping function) of causing the data of the blank page detected by the blank page detecting section 245 not to be subjected to the file creating process and (ii) a separating function of carrying out the file creating process with respect to each image data of a bundle of documents separated by the image data of the separator sheet detected by the separator sheet detecting section 244.

The control section 5a is a block for collectively controlling configurations of the image forming apparatus 10a, and operations of functions of the image forming apparatus 10a. The control section 5a includes a function setting section 51. The function setting section 51 enables the double-side reading function and the blank page skipping function when enabling the separating function.

As described above, in the image forming apparatus 10a, the double-side reading function and the blank page skipping function are enabled when the separating function is enabled. Accordingly, in a case where the separating function is enabled, (i) a document is read and image data of the document is created while the double-side reading function is being enabled and (ii) the file creating process (output process) is carried out with respect to the image data while the blank page skipping function and the separating function are being enabled.

It is possible to carry out the output process while preventing information of each of all the documents from being missing, by enabling the double-side scanning function, even in a case where a plurality of bundles of documents are made up of (i) a plurality of bundles each of which is made up of single-sided documents each having information on its one side, (ii) a plurality of bundles in each of which a single-sided document(s) and a double-sided document(s) each having information on its both sides are mixed or (iii) a plurality of bundles of single-sided documents some of which bundles include a single-sided document(s) which is(are) back to front. This is because all documents are read and image data of the all documents are created, by enabling the double-side reading function.

It is possible to make the image forming apparatus 10a to carry out the following operations merely by enabling the separating function, in case of carrying out an output process with respect to each of the plurality of bundles of documents that are stacked so that an interleaving paper is placed between any adjacent ones of the plurality of bundles of documents in each of which bundles (i) a single-sided document(s) and (ii) a double-sided document(s) each having information on its both sides are mixed (each of which bundles can be made up of merely single-sided documents, merely double-sided documents, or both single-sided document(s) and double-sided document(s)). Specifically, the merely enabling of the separating function allows the image forming apparatus 10a to (i) read both sides of each of the documents to create image data of the both sides, (ii) eliminate data corresponding to a surface (blank page) of each of the single-sided documents which surface has no information, and (iii) carry out the output process with respect to each of the plurality of bundles of documents.

The configuration makes it possible to carry out the output process with respect to each of the plurality of bundles of documents that are continuously read, while eliminating the data of the blank page, without any missing image data of the information of the documents, without carrying out a setting such as a setting for single-sided documents or a setting for double-sided documents, irrespective of documents of which each of the plurality of bundles is made up, and irrespective of single-sided documents, double-sided documents, and means by which the single-sided documents each having two faces are stacked in each of the plurality of bundles.

The configuration also makes it possible to prevent data of a white paper or data of a blank page from being outputted in a case where a document is back to front. Note that it is preferable that, in a case where the documents are all blank pages, a user be notified of it from an operation panel 7.

The image forming apparatus 10a can be configured such that a user can select either (i) a single-sided document mode, (ii) a double-sided document mode, or (iii) a mixed mode in which a bundle of documents is made up of a double-sided document(s) and a single-sided document(s). Such a mode can be selected from the operation panel 7.

The image forming apparatus 10a further includes the image processing apparatus 2a, the operation panel (reception section) 7, the storage section 6, an image output apparatus 3, and an image transmitting and receiving device 4.

The image processing apparatus 2a is a block for carrying out an image process with respect to the image data created by the image input apparatus 1. The image processing apparatus 2a is later described in detail when the image forming apparatus is described. The image processing apparatus 2a of this embodiment includes the document detecting section 24 and the file creating section 31.

The operation panel 7 is a block for providing a user interface (UI) that notifies a user of various information and receives an instruction entered by a user. The operation panel 7 can include an input section including various input keys and buttons, and a display section such as a liquid crystal display. Alternatively, the operation panel 7 can be a touch panel in which a display section and an input section are integrated with each other. The operation panel 7 transmits, to the control section 5a, signals corresponding to settings and an operation instruction of the image forming apparatus 10a in response to the instruction entered by the user.

The image output apparatus 3 is a block for printing image data. It is later described that the image output apparatus 3 prints the image data as the output process of the image forming apparatus 10a.

The image transmitting and receiving device 4 is a block for transmitting outside the file created by the file creating section 31 (carrying out an image transmitting process).

The above description explained, as an example of the output process carried out by the image forming apparatus 10a, the file creating process for creating a file of image data in a case where the separating function is enabled. However, the output process carried out by the image forming apparatus 10a is not limited to the file creating process. Examples of the output process encompass a print process for printing image data, which process is carried out by the image output apparatus (output section or print section) 3 and an image transmitting process carried out by the image transmitting and receiving device (output section or image transmitting section) 4. That is, in a case where the output process carried out by the image forming apparatus 10a is the print process, the image output apparatus 3 functions as an output section that carries out the output process. Meanwhile, in a case where the output process carried out by the image forming apparatus 10a is the image transmitting process, the image transmitting and receiving device 4 functions as an output section that carries out the output process.

According to the configuration of Embodiment 1, which output process to be carried out by the image forming apparatus 10a can be selected by a user through the operation panel 7.

In a case where the file creating process is selected and the separating function is enabled, reading of a document and creation of image data of the document are carried out while the double-side scanning function is being enabled. This causes the file creating process to be carried out with respect to the image data while the blank page skipping function and the separating function are being enabled. As such, it is possible to (i) obtain sets of image data which are filed for each of the plurality of bundles of documents from which a blank page(s) has(have) been eliminated and then (ii) store the sets of image data in the storage section 6 (to create filing data).

In a case where the print process is selected and the separating function is enabled, reading of a document and creation of image data of the document are carried out while the double-side scanning function is being enabled. This causes the print process to be carried out with respect to the image data while the blank page skipping function and the separating function are being enabled. As such, it is possible to obtain printed materials which are processed for each of the plurality of bundles of documents from which a blank page(s) has(have) been eliminated.

In a case where the image transmitting process is selected, and the separating function is enabled, reading of a document and creation of image data of the document are carried out while the double-side scanning function is being enabled. This causes the image transmitting process to be carried out with respect to the image data while the blank page skipping function and the separating function are being enabled. As such, it is possible to transmit image sets of data which are filed for each of the plurality of bundles of documents from which a blank page(s) has(have) been eliminated.

(Flow of Output Process)

The following describes the output process carried out by the image forming apparatus 10a with reference to FIGS. 3(a) through 6.

A user sets a reading condition from the operation panel 7 of the image forming apparatus 10a, and then transmits read data to a PC 60a that is an external apparatus, from the image transmitting and receiving device 4. Note that the PC 60a only receives data and is assumed to be a PC of a user. Note also that it is assumed in the following description that the operation panel 7 is configured by a touch panel.

Figure 3A:
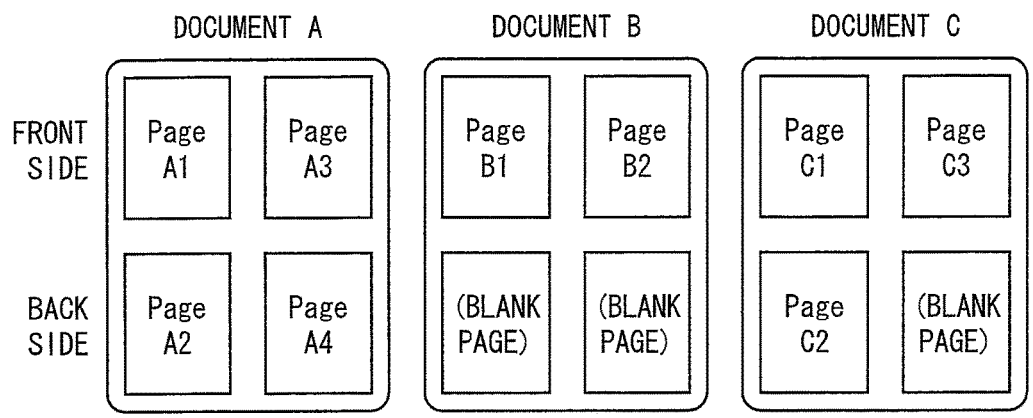
FIG. 3(a) shows examples of a plurality of bundles of documents.

A plurality of bundles of documents read by the image input apparatus 1 is described concretely. FIG. 3(a) shows examples of a plurality of bundles of documents. Each of document A, document B and document C is a bundle of documents. The document A is made up of double-sided documents having information on their both sides. Both sides of each of the double-sided documents have information, i.e., all pages have information. The document B is made up of single-sided documents each of which has information on its single side, and each back side (rear side) of the single-sided documents is a blank page. The document C is made up of double-sided documents, and a back side (rear side) of the last one of the double-sided documents is a blank page. Note that each of the plurality of bundles of documents can be made up of at least one document.

Figure 3B:
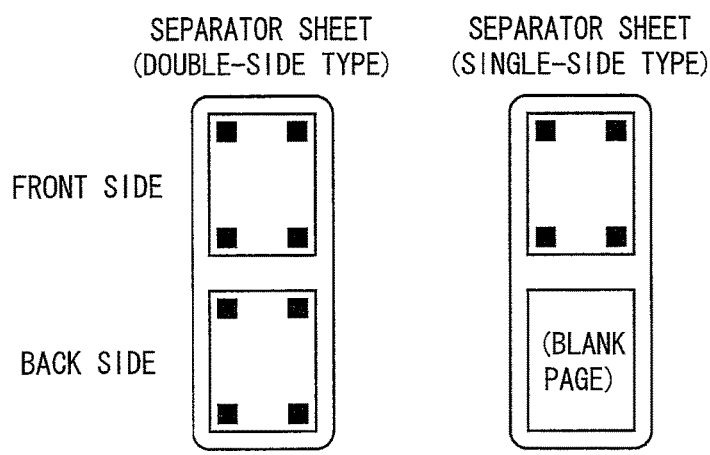
FIG. 3(b) is an explanatory view showing examples of separator sheets.

FIG. 3(b) is an explanatory view showing examples of separator sheets. The separator sheet is placed between any adjacent ones of the plurality of bundles of documents so as to sort the plurality of bundles of documents. Examples of the separator sheet and a method for detecting a separator sheet are described later. The separator sheets can be prepared by a user or printed and outputted by the image output apparatus 3 as described later.

Figure 3C:
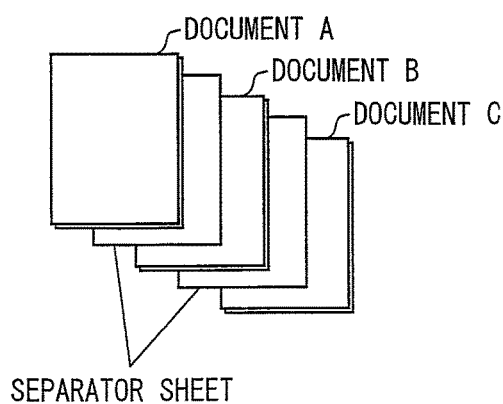
FIG. 3(c) is an explanatory view showing a plurality of bundles of documents.

FIG. 3(c) is an explanatory view showing a plurality of bundles of documents, which indicate a configuration in which a plurality of bundles of documents are stacked so that a separator sheet is placed between any adjacent ones of the plurality of bundles of documents.

The image input apparatus 1 continuously reads the plurality of bundles of documents. The file creating section 31 creates a file for each set of three bundles of documents. Alternatively, other output section carries out an output process with respect to each set of three bundles of documents. That is, in a case of FIG. 3(c), the output process is individually carried out with respect to the document A, the document B, and the document C.

The following describes, with reference to FIGS. 4(a) and 4(b), an example of means by which a display is carried out on the operation panel 7 in a case where a user carries out an output process by use of the image forming apparatus 10a.

FIGS. 4(a) and 4(b) are an example of a screen for setting of reading conditions. In FIGS. 4(a) and 4(b), a "DOUBLE-SIDE READ" button 41 is a button for entering a setting (enabling or disabling) of whether or not both front and back (rear) sides of each document should be read (double-side scanning function). A "BLANK PAGE SKIP" button 42 is a button for entering a setting (enabling or disabling) of whether or not a page of a document is not outputted in a case where the page of the document is a blank page on which nothing is printed (blank page skipping function). A "SEPARATION" button 43 is a button for entering a setting (enabling or disabling) of whether or not a plurality of bundles of documents are continuously read by use of separator sheets so that an output process is carried out with respect to each of the plurality of bundles of documents (separating function).

FIG. 4(a) shows a screen on which the double-side scanning (double-side reading) function, the blank page skipping (blank skipping) function, and the separating function are disabled. FIG. 4(b) shows a screen on which the double-side scanning function, the blank page skipping function, and the separating function are enabled.

In a case where a user presses the "SEPARATION" button 43 so as to enable the separating function, a message screen as shown in FIG. 4(c) is displayed. In a case where the user selects "YES" on the screen of FIG. 4(c), the screen of FIG. 4(c) is changed into the screen of FIG. 4(b). In contrast, in a case where the user selects a "NO" button N on the screen of FIG. 4(c), the screen of FIG. 4(c) is returned to the screen of FIG. 4(a) showing a state in which the separating function has not been enabled.

In a case where the double-side scanning function has been already enabled before the separating function is enabled (i.e., in a case where "DOUBLE-SIDE READ" is enabled in advance from the operation panel 7), it is possible to merely display a message of enabling the blank page skipping function ("BLANK PAGE SKIP" can be carried out). In a case where the blank page skipping function is enabled (i.e., in a case where "BLANK PAGE SKIP" is enabled in advance from the operation panel 7), it is possible to merely display a message of enabling the double-side scanning function ("DOUBLE-SIDE READ" can be carried out). In a case where the double-side scanning (double-side reading) function and the blank page skipping (blank skipping) function are enabled, it is not necessary to display any message.

When the separating function is enabled, (i) a separator sheet setting display column 48, which includes a "SEPARATOR SHEET PRINT" button 45, a printed number setting column 46 and a sheet size setting column 47, is displayed and (ii) the double-side scanning function and the blank page skipping function are enabled regardless of original settings of the double-side scanning function and the blank page skipping function, as shown in FIG. 4(b).

In a case where the "DOUBLE-SIDE READ" button 41 is pressed, while the separating function is being enabled, so as to disable the double-side scanning function, (i) a message screen as shown in FIG. 4(d) is displayed or (ii) a message screen as shown in FIG. 4(e) is displayed. Alternatively, it is possible to disable the double-side scanning function by causing a message screen as shown in FIG. 4(e) to be displayed.

In a case where a user presses an "YES" button Y on the screen of FIG. 4(e) to disable the double-side scanning function, a single-side reading function is enabled, so that a single side of each document is read. For example, in a case where it is proven in advance that each of a plurality of bundles of documents is made up of merely single-sided documents which are not back to front (the front sides having information are not back to front), it is possible to eliminate a process of reading a side (back side (rear side)) of each document which side has no information by disabling the double-side scanning function.

In a case where a user presses the "BLANK PAGE SKIP" button 42 so as to disable the blank page skipping function, a message screen as shown in FIG. 4(f) is displayed. Thereafter, in a case where the user presses an "YES" button Y of FIG. 4(f), the separating function is disabled. In a case where the user presses a "NO" button N, the screen of FIG. 4(f) is returned to the screen of FIG. 4(b) while the separating function is still being enabled. Note that, in a case where the user selects a copy function and the separating function, the blank page skipping function can be disabled so that a blank back side (rear side) of each single-sided document, as it is, is subjected to the output process. Alternatively, a user can select enabling or disabling of the blank page skipping function.

In a case where a "READ" button 44 is pressed after the reading conditions are set, each document is started to be read. In a case where the "SEPARATOR SHEET PRINT" button 45 is pressed, a separator sheet(s) is(are) printed.

The following describes printing of a separator sheet(s). Detection of a document size is later described. In a case where (i) a sheet size and the number of separator sheets are accurately set and (ii) the image output apparatus (interleaving paper output section) 3 receives an instruction entered from the "SEPARATOR SHEET PRINT" button 45, the image output apparatus 3 prints out a separator sheet(s). An image of the separator sheet(s) to be printed is stored in a storage section in advance so as to differ from sheet size to sheet size. Data corresponding to a specified sheet size is read out from the storage section, and then a specified number of separator sheet(s) are printed.

The separator sheet is printed out, in a case where the "SEPARATOR SHEET PRINT" button 45 is pressed after (i) the number of separator sheet(s) is set on a display, as shown in FIG. 4(h), on which the number of separator sheet(s) to be printed can be selected and (ii) the separator sheet size is set on the sheet size setting column 47 displayed on the screen of FIG. 4(b).

In a case where the "SEPARATOR SHEET PRINT" button 45 is pressed after (i) the sheet size is set to an "AUTO" mode and (ii) documents to be read are placed (see FIG. 4(b)), the size of the documents to be read is automatically detected (a method for automatically detecting the size of the documents is later described) so that a separator sheet(s) having a detected size is printed out. In a case where the "SEPARATOR SHEET PRINT" button 45 is pressed in a state where no document is placed after the sheet size is set to the "AUTO" mode, a message, as shown in FIG. 4(g), for notifying a user that the size of the documents is not automatically detected is displayed.

The above description deals with a case where the separating function is enabled in response to the instruction entered from the operation panel 7 by the user. That is, a function setting section 51 enables the separating function in response to the instruction, which is entered by the user, for enabling the separating function (in response to a separating mode instruction).

The image forming apparatus 10a can also be configured such that the separating function, the double-side reading function and the blank page skipping function are automatically enabled in a case where the separator sheet detecting section 244 detects image data of a separator sheet. According to the configuration, the separating function, the double-side reading function, and the blank page skipping function are automatically enabled, even in a case where a user does not enter the instruction for enabling the separating function.

The image forming apparatus 10a of the present embodiment is described as a multifunction peripheral including the image output apparatus 3. It is, however, apparent that the present invention is applicable to an image reading apparatus (scanner) including no image output apparatus 3. In a case where the present invention is applied to the image reading apparatus, the operation panel 7 corresponds to a scanner condition setting screen (a setting screen of a scanner driver) of a computer connected to the image reading apparatus on which screen a scanner condition is to be set. The image reading apparatus includes no black generation and under color removal section 27.

Figure 5:
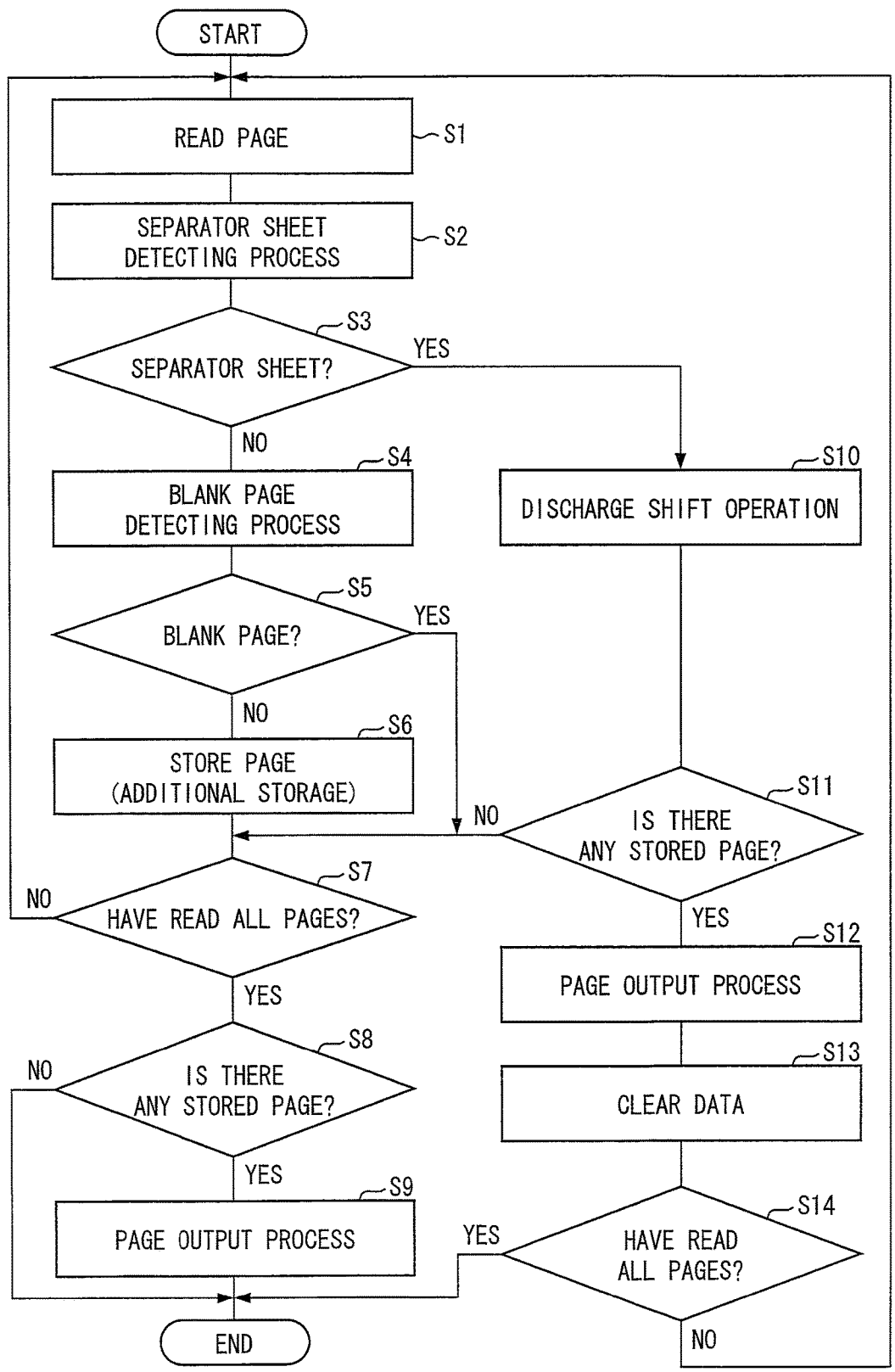
FIG. 5 is a view showing a flow of a process for detecting a separating function.
Figure 6:
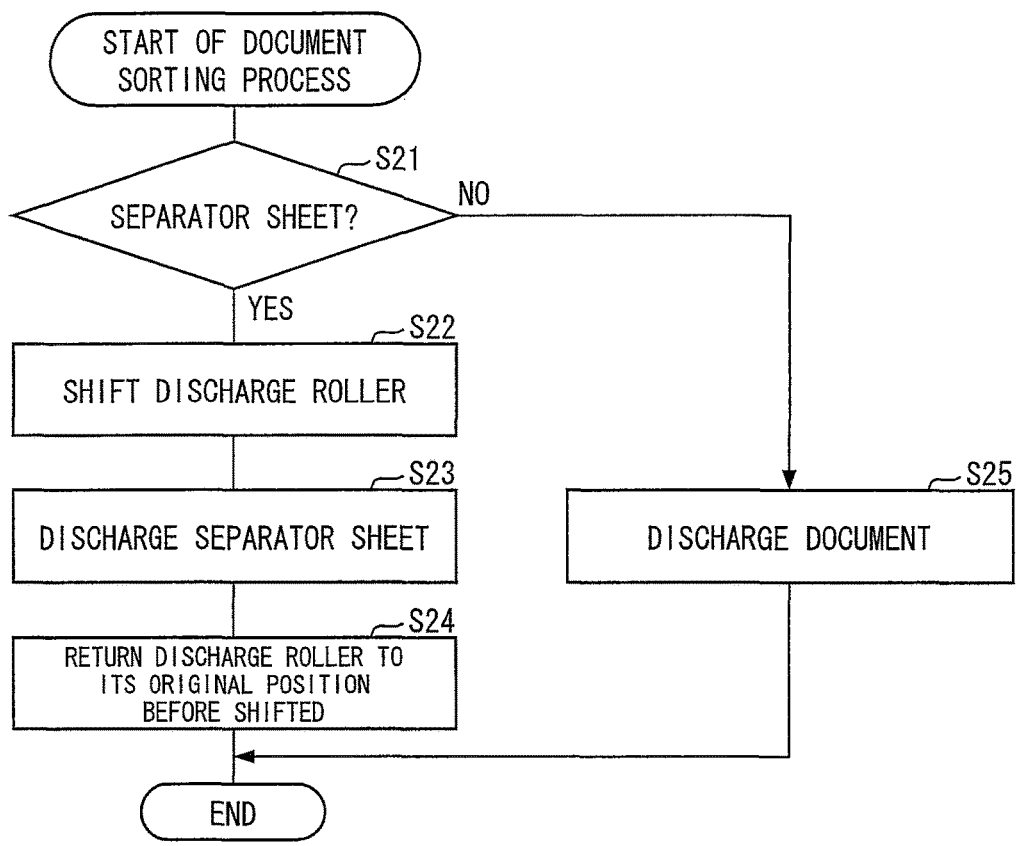
FIG. 6 is a view showing a flow of a document sorting process.

The following describes reading and an output process with reference to FIGS. 5 and 6.

In a case where the image input apparatus 1 obtains image data by reading pages one by one (S1), the separator sheet detecting section 244 carries out a later described process for detecting a separator sheet (S2), so as to detect the separator sheet (S3). In a case where no separator sheet is detected (NO in S3), the blank page detecting section 245 carries out a later described process for determining whether or not the each page is a blank page (S4), so as to determine whether or not the each page is a blank page (S5). In a case where the blank page detecting section 245 determines that the each page is not a blank page (NO in S5), image data of the pages is temporarily stored (additionally stored) in the storage section 6 (S6), and the process proceeds to S7. In a case where the blank page detecting section 245 determines that the each page is a blank page (YES in S5), S6 is skipped and the process proceeds to S7.

It is confirmed whether or not all the pages are read (S7). In a case where all the pages are not read (NO in S7), the process returns to S1. In a case where all the pages are read (YES in S7), it is confirmed whether or not the storage section 6 stores a page(s) (S8). In a case where the storage section 6 stores no page (NO in S8), the process ends. In a case where the storage section 6 stores a page(s) (YES in S8), such a page(s) (a bundle of documents) stored in the storage section 6 is (are all) subjected to the output process (S9). In a case of the file creating process, the page(s) stored in the storage section 6 is(are) created into a single file. The single file can be transmitted to an external apparatus.

In a case where the separator sheet is detected in S3 (YES in S3), a discharge shift operation is carried out (S10), and it is confirmed whether or not the storage section 6 stores a page(s) (S11). In a case where the storage section 6 stores a page(s) (YES in S11), Such a page(s) (a bundle of documents) stored in the storage section 6 is(are all) subjected to the output process (S12). In a case of the file creating process, the page(s) stored in the storage section 6 is(are) created into a single file. The single file can be transmitted to an external apparatus. Thereafter, data stored in the storage section 6 is cleared (S13), and then it is confirmed whether or not all the pages are read (S14). In a case where all the pages are not read (NO in S14), the process returns to S1. In a case where all the pages are read (YES in S14), the process ends. In a case where the storage section 6 the process returns to S1. In a case where the storage section 6 stores no page (NO in S11), the process proceeds to S7.

In the case where the separator sheet is detected in the above-described process, the separating function is applied to image data read before the separator sheet is detected. Therefore, in a case where a bundle of documents, read before the separator sheet is detected, is made up of a single-sided document(s), a file, in which a blank page(s) of back (rear) side(s) of the single-sided document(s) is(are) eliminated, is created. Alternatively, the separator sheet detecting process can be carried out after the blank page detecting process.

The following operation can be carried out. Specifically, double sides of each document are always read regardless of single-side reading or double-side reading, and sets of image data of the double sides are stored in the storage section 6. In a case where a user selects the single-side reading or the copy function, only single-side data is read out and outputted from the storage section 6. As such, it is also possible to output sets of image data of double sides of a document(s) read before the separator sheet is detected.

The image input apparatus 1 includes a document shift mechanism for distinguishing a separator sheet from other document(s) in a case where a document read by the image input apparatus 1 is a separator sheet. The document shift mechanism is later described in detail. FIG. 6 shows means by which the document shift mechanism processes. Specifically, it is confirmed whether or not a read document is a separator sheet based on a result detected by the separator sheet detecting section 244 (S21). In a case where it is confirmed that the read document is a separator sheet (YES in S21), a discharge roller is shifted (the discharge shift operation is carried out) (S22) to discharge the separator sheet (S23). Thereafter, the discharge roller is returned to its original position before it is shifted (S24). In a case where it is confirmed that the read document is not a separator sheet (NO in S21), the read document is discharged as it is. The document shift mechanism allows a bundle of documents and a separator sheet(s) to be separately discharged.

As described above, the function setting section 51 enables the double-side scanning function and the blank page skipping function while enabling the separating function. The present embodiment is not limited to this. The function setting section 51 can further enable, for example, the following functions (A) and (B).

(A) Output Color Determining Function

The image forming apparatus 10a includes a color discriminating section for discriminating whether the image data created by the image input apparatus 1 is monochrome image data or color image data. The image forming apparatus 10a has an output color determining function of (i) carrying out a monochrome output process with respect to image data which has been discriminated to be monochrome image data by the color discriminating section and (ii) carrying out a color output process with respect to image data which has been discriminated to be color image data by the color discriminating section. In a case where the function setting section 51 enables the separating function, the output color determining function is also enabled.

While the output color determining function is being enabled, the image data can be printed in color or monochrome in accordance with a discrimination (ACS: Automatic Color Selection) made by the color discriminating section, in a case where an output process is a print process. That is, a user does not need to set color or monochrome printing for each bundle of documents. In a case where the output process is a file creating process or an image transmitting process, it is possible to reduce a file size in a case of a monochrome document by causing a color correction section to convert R, B and G signals into K signals (for example, in FIG. 1, a color correction section 25 outputs R=K, G=K and B=K signals without going through the black generation and under color removal section 27) so that the signals of R, G and B color components are all K signals. Note that the R, G and B signals are converted into the K signals, for example, on the basis of the following expression (2). By the expression (2), luminance values of the R, G and B signals are calculated, and replaced by luminance values of the K signals.

$$Yj = 0.30 Rj + 0.59 Gj + 0.11 Bj \qquad (2)$$

Yj: luminance signal of a pixel

Rj, Gj and Bj: color components of a pixel (B) Top-to-Bottom Direction Correcting Function The image forming apparatus 10a includes a top-to-bottom determining section for determining top-to-bottom of the image data created by the image input apparatus 1. The image forming apparatus 10a has a top-to-bottom direction correcting function of carrying out the output process with respect to the image data after correcting, based on a determination made by the top-to-bottom determining section, a top-to-bottom direction of the image data to a forward direction (a correct direction of top-to-bottom of a document). In a case where the function setting section 51 enables the top-to-bottom correcting function, the separating function is also enabled.

In a case where the top-to-bottom correcting function is enabled, it is possible to carry out the output process with respect to image data of each bundle of documents whose top-to-bottom directions are corrected to their forward directions, even in a case where the top-to-bottom directions of the respective bundles of documents are not identical to each other. That is, a user does not need to determine the top-to-bottom directions for respective documents.

(Separator Sheet)

The following describes an example of a separator sheet (interleaving paper), and a method for detecting a separator sheet.

Figure 7A:
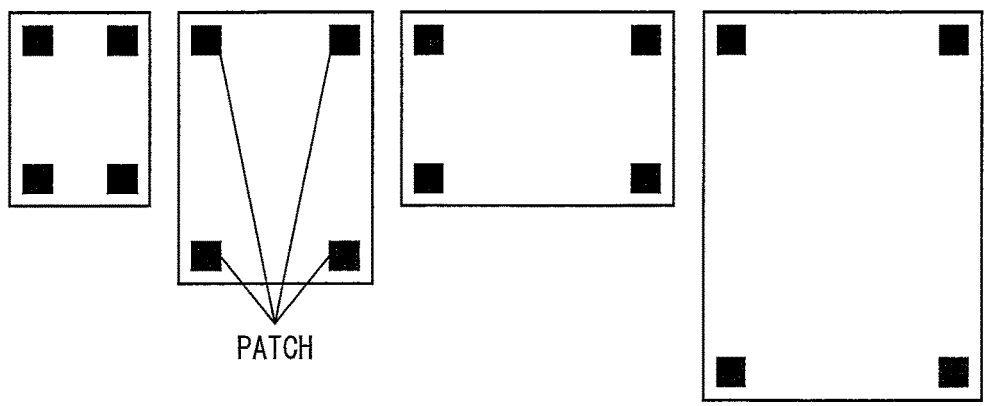
FIG. 7(a) is a view showing an example of a separator sheet in which patches are used.
Figure 7B:
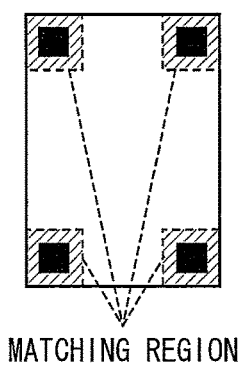
FIG. 7(b) is a view showing an example of a detection region of a separator sheet in which patches are used.
Figure 7C:
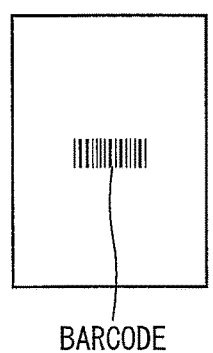
FIG. 7(c) is a view showing an example of a separator sheet in which a barcode is used.
Figure 7D:
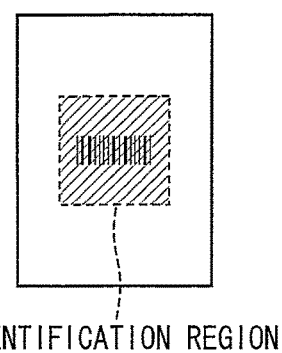
FIG. 7(d) is a view showing an example of a detection region of a separator sheet in which a barcode is used.

FIGS. 7(a) and 7(b) show an example of a separator sheet in which patches (identifiers) are used. In this example, four square patches having an identical size (for example, a square patch having a side of 2 cm) are provided on the separator sheet so as to be distant by a constant distance (for example, 1 cm) from respective four corners of the separator sheet regardless of the size of the separator sheet.

In a case where the separator sheet is used, the separator sheet detecting section 244 detects the separator sheet as follows. Binarization is carried out with respect to each of four oblong areas (matching regions of FIG. 7(*b*)) each defined by two sides, having a certain length (for example, 4 cm), which define a corresponding one of four corners of the image data read by the image input apparatus 1, and then matching between binarized results and image data of a separator sheet stored in advance in the storage section 6 is carried out for each pixel. Of the pixels in the matching region the number of matched pixels is not less than a certain ratio (for example, not less than 95%), it is determined that a document having the image data read by the image input apparatus 1 is a separator sheet.

FIGS. 7(*c*) and 7(*d*) show an example of a separator sheet in which a barcode (identifier) is used. In this example, a barcode is provided in the center of a separator sheet regardless of the size of the separator sheet. In a case where such a separator sheet is used, the separator sheet detecting section 244 detects the separator sheet as follows. Binarization is carried out with respect to an oblong area (an identification region of FIG. 7(*d*)) defined by a certain length from the center of the image data read by the image input apparatus 1, and then the barcode is identified. In a case where code information, indicating a separator sheet which code information is stored in advance in the storage section 6, is obtained, it is determined that a sheet having the image data read by the image input apparatus 1 is a separator sheet.

The identifier indicating that a sheet is a separator sheet is not limited to the above identifier, provided that it can be detected as a separator sheet by the separator sheet detecting section 244.

A separator sheet can have the identifier on its single side. Alternatively, the separator sheet can have identifiers on its both sides, as shown in FIG. 3(*b*).

In a case where the identifier is provided on the single side of the separator sheet, a blank page of a back side (rear side) of the separator sheet is eliminated by the blank page skipping function. Note that the blank page is likely not to be detected, depending on a thickness or a material of the separator sheet. This may cause the blank page not to be eliminated. This is because the patches or the barcode on one side of the separator sheet are(is) identified on the other side of the separator sheet, though the patches or the barcode are(is) merely provided on the one side of the separator sheet. In order to address the problem, it is necessary to change a threshold based on which the blank page detecting section 245 detects, in a case where the separating function is enabled while using the separator sheet merely having the identifier on its one e side, and. An example of the changing in threshold is later described.

As described above, the identifier can be provided on the both sides of the separator sheet. In this case, the both sides are detected as a separator sheet. Therefore, the above problem of identifying the identifier on the other side of the separator sheet will not occur.

(Blank Page Determination)

The following describes a method for determining a blank page. For example, the following steps (1) through (8) disclosed in Patent Literature 2 (Japanese Patent Application Publication, Tokukai No. 2010-56803 A) can be employed as the method for determining a blank page.

(1) For each of R, G and B planes (for each of R, G and B color components), an average value of a block (for example, 7×7 pixels) made up of a plurality of pixels that include a target pixel is calculated. Such an average value is defined as a pixel value of the target pixel.

(2) For each of the R, G and B planes (for each of the R, G and B color components), a maximum density (pixel value) difference of the block (for example, 7×7 pixels) made up of the plurality of pixels that include the target pixel is calculated. It is determined whether or not the target pixel of the block is an edge pixel based on a comparison of the maximum density (pixel value) difference with an edge determination threshold. That is, in a case where the maximum density (pixel value) difference of any one of the R, G and B color components is not less than the edge determination threshold (for example, not less than 30), the target pixel is determined to be an edge pixel. Alternatively, note that an edge pixel can be determined by (i) calculating a dispersion value instead of the maximum density (pixel value) difference and then (ii) determining that the target pixel is an edge pixel in a case where the dispersion value is not less than a threshold.

(3) The number of pixel(s) determined to be edge pixel(s) is counted in (2).

(4) The average values of the respective planes (the respective R, G and B color components) of the target pixel calculated in (1) are compared to each other. A maximum value and a minimum value of the average values of the respective R, G and B color components of each target pixel are calculated. A histogram of the maximum values and a histogram of a difference between the respective maximum values and the respective minimum values (hereinafter referred to as a maximum difference) are created.

(5) In a case where the count number of edge pixel(s) is greater than a first determination threshold, a text region or a halftone region is present on a page. Therefore, it is determined that the page is not a blank page.

(6) In a case where the count number of edge pixel(s) is not more than the first determination threshold (for example, not more than 5000), the page is determined to be a blank page or a photograph that is a photograph created by use of a photographic paper.

(7) In a case where it is determined that the page is a blank page or a photograph created by a photographic paper, a total number of widths, in each of which frequencies of the histogram of the maximum values created in (4) are greater than a second determination threshold (for example, 500), is referred to as a maximum value histogram document density (pixel value) width. Another total number of widths in each of which frequencies of the histogram of the maximum difference created in (4) are greater than the second determination threshold is referred to as a maximum difference histogram document density (pixel value) width.

(8) In a case where each of (i) calculated maximum value histogram document density (pixel value) width and (ii) calculated maximum difference histogram document density (pixel value) width is smaller than a third determination threshold (for example, less than three (3)), the page is determined to be a blank page.

According to the above method, the edge pixel is determined. Instead of the determination of the edge pixel, a maximum value and a maximum difference of average values of respective R, G, and B color components are calculated on the basis of the average values of a block of the respective R, G, and B color components, and histograms of the maximum value and the maximum difference are created for each of the respective R, G, and B color components so that it is determined whether or not the page is a blank page. In this case, the number of maximum difference histogram document density (pixel value) widths (the number of density (pixel value) widths) is detected in addition to a determination of the maximum value histogram document density (pixel value) width and the maximum difference histogram document density (pixel value) width. It is determined that the page is a blank page, in a case where (i) each of the maximum value histogram document density (pixel value) width and the maximum difference histogram document density (pixel value) width is smaller than the third determination threshold (for example, less than three (3)) and (ii) the number of the maximum difference histogram document density (pixel value) widths is one (1).

The method for determining a blank page is not limited to the above method. Alternatively, for example, a page can be determined to be a blank page by (i) counting the number of black pixel(s) and the number of white pixel(s) on a page and then (ii) causing the numbers to be subjected to a threshold process. In this method, the number of white pixel(s) and the number of black pixel(s) can be counted by lowering a resolution of image data of the page and then binarizing the image data. A threshold, based on which whether or not a page is a blank page is determined, can be set based on (i) which level of image is determined to be a blank or (ii) a resolution of the image.

In a case where a separator sheet having the identifier (such as the patch or the barcode) on its one side is used, the number of edge pixel(s) identified on the other side of the separator sheet, though the identifier is provided on merely the one side of the separator sheet is predicted in advance, and then the number of edge pixel(s) is added to the first determination threshold. This allows an influence of the edge pixel(s) identified on the other side of the separator sheet to be eliminated. In order to eliminate such an influence, the following concrete measures should be taken in the method for determining a blank page (blank document). Specifically, the edge determination threshold, the first determination threshold for the count number of edge pixel(s), and the third determination threshold for the maximum value histogram document density (pixel value) width and the maximum difference histogram document density (pixel value) width are set to greater values, as compared with a case where only a blank document is skipped. For example, the edge determination threshold is set to 40, the first determination threshold for the number of edge pixel(s) counted is set to 7000, and the third determination threshold for the maximum value histogram document density (pixel value) width and the maximum difference histogram document density (pixel value) width is set to 5.

(Color Determination)

The following describes an automatic color selection (ACS) process. The automatic color selection process is a technique for automatically determining, on the basis of input image data, whether an image is a monochrome image or a color image. For example, a method described in Patent Literature 3 (Japanese Patent Application Publication, Tokukaihei No. 4-282968 A) can be employed.

According to the method disclosed in Patent Literature 3, it is determined whether each pixel is a color pixel or a monochrome pixel. In a case where not less than a predetermined number of color pixels that are consecutively aligned in a given pixel order is detected, the consecutive color pixels are recognized as a color block. In a case where not less than the predetermined number of color blocks is included in one (1) line, such one line is counted as a color line. In a case where a predetermined number of color lines are included in a document, it is determined that the document is a color image. In contrast, in a case where the predetermined number of color lines are not included in a document, it is determined that the document is a monochrome image. It is possible to appropriately set (i) a criterion based on which whether or not a block is a color block is determined and (ii) the number of color lines included in a document, based on the number of color pixels which causes the document to be determined to be a color document.

In the above method, it is possible to determine whether each pixel is a color pixel or a monochrome pixel by a publicly known method such as (i) a method for comparing, with a threshold THa, a difference between a maximum value and a minimum value of R, G and B signals (max (R, G, B)−min (R, G, B)≥Tha (for example, Tha=20)) or (ii) a method for comparing, with the threshold Tha, an absolute value of a difference between any two of color components of the R, G and B signals.

Alternatively, it is determined whether a pixel is a chromatic pixel or an achromatic pixel, by comparing, with the threshold Tha (for example, Tha=20), a difference between a maximum value and a minimum value of R, G and B signals. In a case where it is determined that the pixel is a chromatic pixel, the number of chromatic pixel(s) included in a whole document is counted. In a case where the number of chromatic pixels is, for example, not less than 7000, it is determined that the document is a color document. The reason why the threshold Tha is used not as a ratio of the chromatic pixel(s) to the whole document but as an absolute number is that it is necessary to determine that an A3 document on which a seal is put is a color document.

The publicly known method such as the method for comparing, with a threshold, an absolute value of a difference between any two of color components of the R, G and B signals can be employed as the method for determining whether a pixel is a chromatic pixel or an achromatic pixel. An ACS method is not limited to the above method. Any methods can be employed provided that it can be determined with high accuracy whether a document is a color document or a monochrome document.

(Determination of Multi-level and Binary)

In a case where the file creating process or the image transmitting process is selected as an output process in the present embodiment, not only multi-leveled image data but also binary image data can be outputted as with a case of the print process. The binary image data is created in a binarization process by a halftone generation section 30 of the image forming apparatus 10a. In the binarization process, a threshold is set to, for example, 128 in a case of 8-bit image data. Alternatively, it is possible to binarize a target pixel in a pixel block by use of a threshold which is an average value of the pixel block made up of a plurality of pixels (for example, 3×3 pixels or 5×5 pixels).

It is determined whether to output the image data in the form of a binary image data by an instruction entered by a user from the operation panel 7. Alternatively, the document detecting section 24 determines whether to output the image data in the form of a multi-leveled image or a binary image. The output process reflects a result determined by the document detecting section 24.

The following describes a method for determining whether to output the image data in the form of a binary image data or a multi-leveled image data. The document detecting section 24 can include a processing section for carrying out a document type determining process. Alternatively, the document type determining section can be provided so as to follow the document detecting section 24 or so as to be followed by the document detecting section 24.

The document type determining process (a process for automatically determining a document type) is a technique for automatically determining a type of a read document on the basis of input image data of the read document. It is, for example, determined whether the read document is a text document, a printed photograph (printed-picture) document, or a text and printed-picture document including both a text and a printed-picture. For example, a method described in Patent Literature 4 (Japanese Patent Application Publication, Tokukai No. 2002-218232 A) can be employed.

According to the method disclosed in Patent Literature 4, a density (pixel value) histogram of a document is created, and it is determined, by use of a feature of the density (pixel value) histogram, whether a read document is a text document, a printed-picture document, or a text and printed-picture document. Note that a photograph of the present embodiment includes (i) a printed-picture made up of halftone dots, and (ii) a photograph made up of continuous tone image regions.

FIG. 8(a) shows an example of a density (pixel value) histogram of a page (document) having only a text thereon. FIG. 8(b) shows an example of a density (pixel value) histogram of a page (document) having only a photograph thereon. FIG. 8(c) shows an example of a density (pixel value) histogram of a page (document) having a text and a photograph thereon. The method disclosed in Patent Literature 4 employs a difference in features of the density (pixel value) histograms due to the type of the documents.

Generally, a text document is constituted by a text and a page background. Therefore, according to the density (pixel value) histogram of the text document, density (pixel value) widths of the text and the page background show high frequencies, whereas a density (pixel value) width is narrow as a whole (see FIG. 8(a)). This demonstrates that the text document has a feature of having a lot of density (pixel value) widths whose frequencies are small.

With the use of such a feature, it is possible to determine whether or not an input document is a text document, by (i) comparing each frequency of a corresponding density (pixel value) width with a small frequency threshold so that density (pixel value) widths whose frequencies are small are extracted (ii) comparing the number of counted density (pixel value) widths whose frequencies are small with a predetermined first threshold, based on which it can be determined whether or not there is a large number of density (pixel value) widths whose frequencies are small, so as to know whether or not there is a large number of density (pixel value) widths whose frequencies are small.

A text document generally has another feature of having a high proportion of page background over the text document. That is, in a case where a maximum frequency MAX 1 of the density (pixel value) histogram is close to a total frequency of the density (pixel value) histogram, it is considered that a density (pixel value) width including the MAX 1 corresponds to a page background of the text document.

It is therefore possible to determine whether or not an input document is a text document, by comparing, with the MAX 1, a second threshold set in advance, based on which it is possible to determine whether or not the MAX 1 is close to the total frequency, so that it is possible to determine whether or not a page background is present or absent depending on whether or not the MAX 1 is greater than the second threshold.

A photograph document generally has a broad density (pixel value) width and less deviation in density width. Therefore, as shown in FIG. 8(b), the photograph document has a feature that its density (pixel value) histogram has a broad density (pixel value) width as a whole, and has at least two substantially equivalent local maxima of frequencies.

It is therefore possible to determine whether or not the input document is a photograph document depending on whether or not there are two substantially equivalent local maxima of frequencies in the density (pixel value) histogram. It is possible to determine based on (MAX 1−MAX 2) whether or not there are two substantially equivalent local maxima of frequencies. The MAX 1 indicates a first maximum frequency density (pixel value) width to which the highest frequency belongs. The MAX 2 indicates a second maximum frequency density (pixel value) width in which there is a maximum frequency and which is a density (pixel value) width other than a density (pixel value) width adjacent to the first maximum frequency density (pixel value) width.

Note, however, that it is considered that (MAX 1−MAX 2) based on which it is determined that the input document is a photograph document changes depending on a document size. In order for the document size to less affect the determination of the type of document, it is preferable that a ratio of total frequency (ALL) to (MAX 1−MAX 2) be compared to a third threshold. The third threshold is set in advance so that it is possible to determine whether or not the two local maxima are substantially equivalent to each other.

Note also that, in a case where a document is a text and photograph document which is largely occupied by a photographic image and is partially occupied by a text image, (MAX 1−MAX 2) of the text and photograph document can be substantially equal to that of a photograph document that is occupied by a photographic image only. In this case, the third threshold is set after determining whether an input document is processed as a text and photograph document or as a photograph document. It is preferable to set the third threshold on the basis of a relationship with the types of documents after measuring (MAX 1−MAX 2) of as many documents as possible.

There can be a case where a difference between a first maximum frequency (MAX 1) and a second maximum frequency (MAX 2) in a density (pixel value) histogram of a text document equals to that of a density (pixel value) histogram of the photograph document. In this case, a ratio of a total frequency (ALL) to (MAX 1−MAX 2) of the text document equals to that of the photograph document. As such, it is not possible to distinguish the text document from the photograph document.

In order to address the problem, it is first determined whether or not a document is a text document is determined, and then it is determined whether or not only a document that has been determined not to be a text document is a photograph document. This makes it possible to surely distinguish the text document from the photograph document. As such, it is surely possible to eliminate an erroneous determination in such a case.

In a case where the input document is a text and photograph document, the density (pixel value) histogram of the text and photograph document has neither the feature of the text document nor the feature of the photograph document, as shown in FIG. 8(c). It is therefore possible to determine that an input document, which has been determined not to be a text document or a photograph document, is a text and photograph document.

Image data of a document, which has been determined to be a text document in the document type determining process, is determined to be binary image data. Image data of a document, which has been determined to be a photograph document in the document type determining process, is determined as multi-leveled image data. Image data of a document, which has been determined, in the process for automatically determining a document type, to be a text and photograph document in which a text and a photograph is mixed, is determined to be image data in which binary image data and multi-leveled image data are mixed.

In this case, it is necessary to urge a user to enter an instruction on whether the image data should be subjected to a multi-leveled process or a binary process. Alternatively, it is possible for the image data to be subjected to a multi-leveled process or a binary process in accordance with a ratio between the number of pixels which have been determined to be a photograph and the number of pixels which have been determined to be a text, with reference to a result obtained by carrying out a segmentation process (in which a region is separated into a text, a halftone dot, a continuous tone image, or a page background). For example, in a case where the number of pixels that have been determined to be a text is greater than the number of pixels that have been determined to be a photograph, the image data is subjected to the binary process. In a case where the number of pixels that have been determined to be a photograph is greater than the number of pixels that have been determined to be a text, the image data is subjected to the multi-leveled process. In case where the number of pixels that have been determined to be a text substantially equals to the number of pixels that have been determined to be a photograph, the image data is subjected to the multi-leveled process. Alternatively, it is possible to urge a user to select either the binary process or the multi-leveled process.

The segmentation process is to determine to which region each pixel of input image data belongs. For example, the segmentation process determines to which region of a text, a halftone dot, a continuous tone image, a page background, or the like each pixel of the input image data belongs. Note that the segmentation process is not limited to determine an image region for each pixel, and can therefore determine an image region for every unit of a plurality of pixels. For example, a method disclosed in Patent Literature 5 (Japanese Patent Application Publication, Tokukai No. 2002-232708 A) can be employed.

According to the method disclosed in Patent Literature 5, (i) a maximum density (pixel value) difference that is a difference between a minimum density (pixel value) and a maximum density (pixel value) of a block made up of n×m pixels (for example, 15×15 pixels) including a target pixel and (ii) a total density (pixel value) busyness that is a sum of absolute values of differences in densities (pixel values) of any adjacent two pixels are calculated, and are then compared to a plurality of thresholds that are set in advance. This allows the block to be separated into (i) a page background/continuous tone image region and (ii) a text edge/halftone dot region.

Firstly, the maximum density (pixel value) difference and the total density (pixel value) busyness are calculated. Thereafter, the maximum density (pixel value) difference and a maximum density (pixel value) difference threshold are compared to each other, and the total density (pixel value) busyness and a total density (pixel value) busyness threshold are compared to each other. It is determined that the target pixel belongs to the page background/continuous tone image region, in a case where it is determined that (i) the maximum density (pixel value) difference is smaller than the maximum density (pixel value) difference threshold and (ii) the total density (pixel value) busyness is also smaller than the total density (pixel value) busyness threshold. Otherwise, it is determined that the target pixel belongs to a text/halftone region.

Thereafter, in a case where it is determined that the target pixel belongs to a page background/continuous tone image region, a calculated maximum density (pixel value) difference and a page background/continuous tone image region determination threshold are compared to each other. In a case where the maximum density (pixel value) difference is smaller than the page background/continuous tone image region determination threshold, it is determined that the target pixel belongs to a page background region. In a case where the maximum density (pixel value) difference is greater than the page background/continuous tone image region determination threshold, it is determined that the target pixel belongs to a continuous tone image region.

In a case where the target pixel belongs to a text/halftone dot region, the calculated total density (pixel value) busyness and a value obtained by multiplying the maximum density (pixel value) difference by a text/halftone dot determination threshold are compared to each other. In a case where the total density (pixel value) busyness is smaller than the value, it is determined that the target pixel belongs to a text edge region. In a case where the total density (pixel value) busyness is greater than the value, it is determined that the target pixel belongs to a halftone dot region.

Note that a method for determining whether to output the image data in the form of a binary image data or a multi-leveled image data is not limited to the above method.

(Top-to-bottom Determination)

The following describes a method for determining a top-to-bottom of a document. In the document detecting section 24 of FIG. 2, a top-to-bottom determining section (not shown) can be provided so as to follow the binarization section 243 and so as to be connected in parallel with the separator sheet detecting section 244. In the following example, an OCR (text recognition) is used. Therefore, the storage section 6 has dictionary data stored therein. The top-to-bottom can be determined by, for example, the following steps (1) through (5) described in Patent Literature 6 (Japanese Patent Application Publication, Tokukaihei No. 6-189083 A).

(1) Firstly, texts of a document are recognized by means of an OCR technique, and each of the texts of the document is cut out so as to create a text pattern.

(2) Databased text pattern information is compared to a feature of the text pattern. Matching is carried out as follows: While text pattern that is cut out is being superimposed on the databased text pattern, black and white of a created text pattern is compared, for of each pixel, with that of a databased text pattern so as to determine whether or not the matching is complete. It is determined that a text of an input pattern is the databased text pattern in a case where the matching is complete. In a case where there is no databased text pattern which allows the matching to be complete in every pixel, it is determined that the text of the input pattern is a databased text pattern whose number of matched pixels is largest. Note that it is determined to be beyond recognition in a case where its matching ratio does not reach a predetermined matching ratio or greater.

(3) The created text pattern is rotated at angles of 90°, 180°, and 270°, and the method (2) is carried out at the respective angles.

(4) The numbers of recognizable texts are compared between the respective angles of the text pattern, which are obtained in the methods (2) and (3). A direction defined by a rotation angle at which the number of recognizable texts is greatest is determined to be a proper direction of the texts. In this manner, the top-to-bottom of the document is determined.

(5) Output results are obtained at respective angles of 0°, 90°, 180° and 270°.

Note that the method for determining a top-to-bottom is not limited to the above method.

(Image Input Apparatus)

Figure 9:
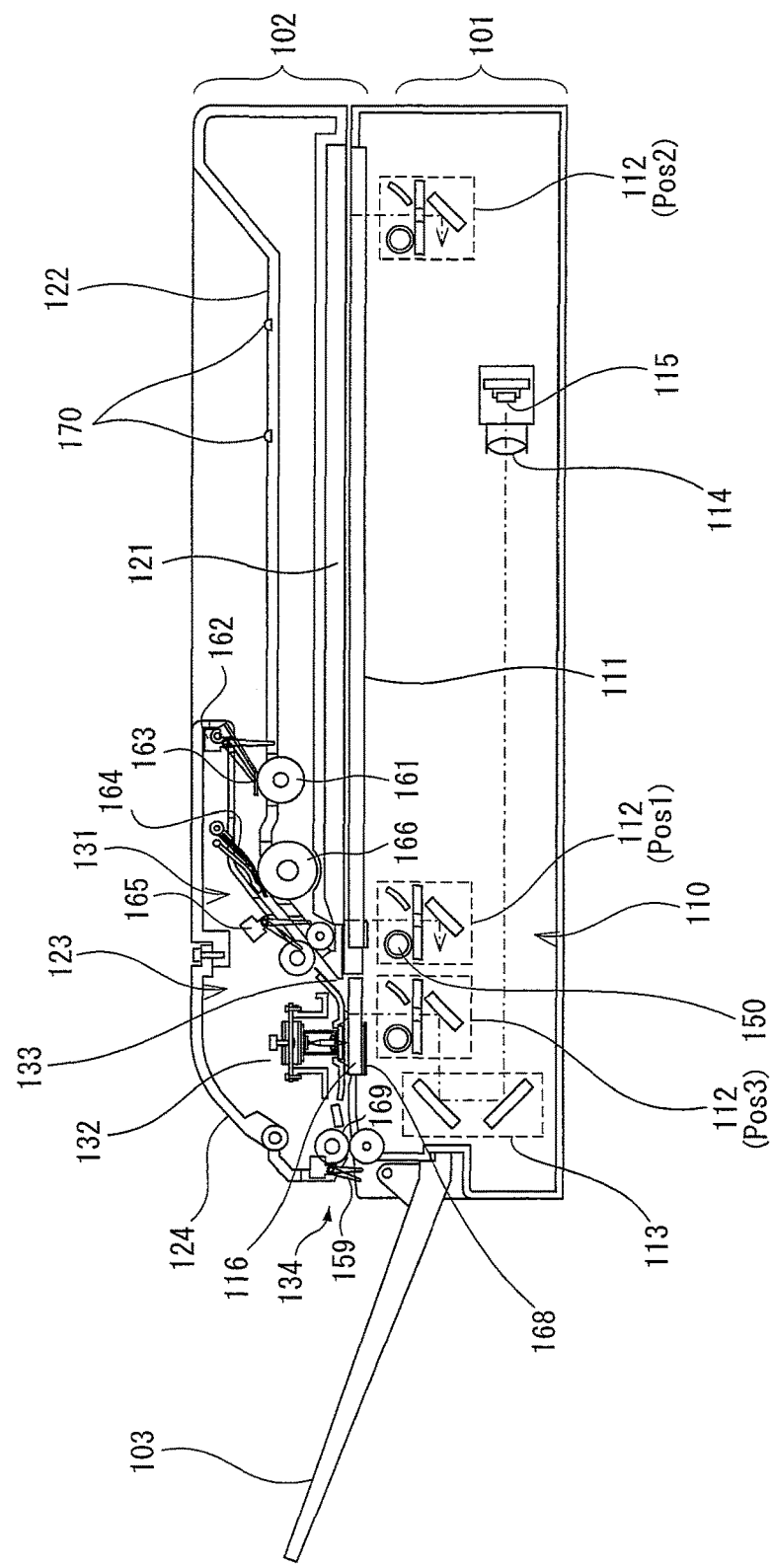
FIG. 9 is a view showing a configuration of an image input apparatus.

The following describes a configuration of the image input apparatus (image input section) 1. FIG. 9 is a view showing the configuration of the image input apparatus 1. As shown in FIG. 9, the image input apparatus 1 includes a lower housing 101, an upper housing 102, and a paper output tray 103.

The image input apparatus 1 is configured so as to read an image on a document in (i) a static-sheet reading mode in which an image on a document which is in a stationary state is read (scanned), (ii) a sheet-feed reading mode in which an image on a document is read while the document is being carried, or (iii) a double-side mode in which images of both sides of a document are read. Various instructions such as selection of these modes are entered to the image input apparatus 1 from the operation panel 7.

In the static-sheet reading mode, a first reading section 110 of the lower housing 101 reads an image. In the sheet-feed reading mode, a second reading section 123 of the upper housing 102 reads an image. In the double-side mode, the first reading section 110 and the second reading section 123 simultaneously used.

As shown in FIG. 9, the lower housing 101 includes the first reading section 110 and a first contact glass 111. The first reading section 110 includes a first scanning unit 112, a second scanning unit 113, an image focusing lens 114, a CCD (Charge Coupled Device) 115, and a second contact glass 116.

Figure 10:
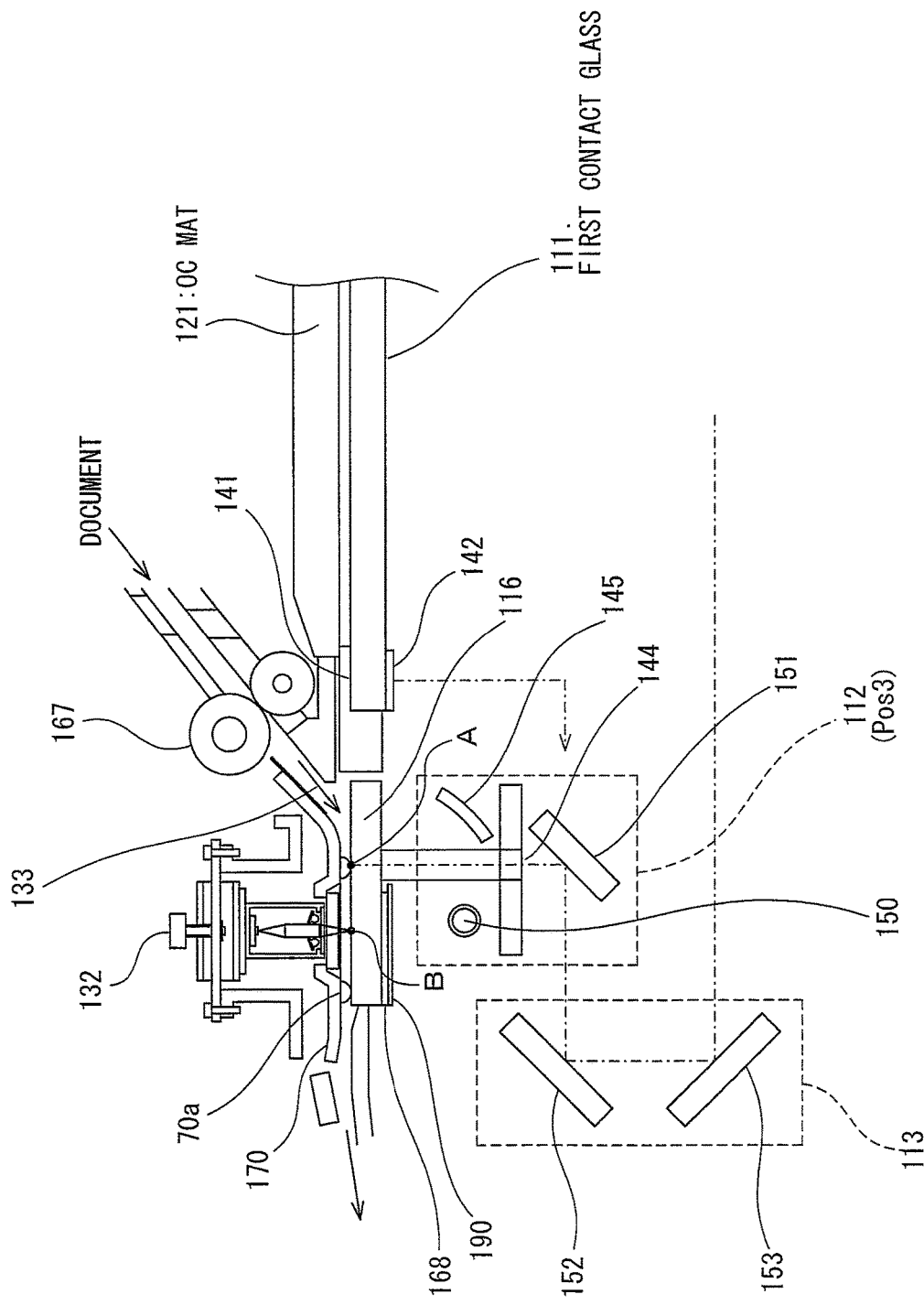
FIG. 10 is a view showing in detail a configuration of a document carrying section and its surroundings of the image input apparatus shown in FIG. 9.

The second contact glass 116 is a document feeder tray on which a document to be read in the static-sheet reading mode is placed. The first scanning unit 112 exposes a document while moving from left to right along the first contact glass 111 at a constant speed of V. The first scanning unit 112 includes a light source (exposure lamp) 150, and a first reflection mirror 151 for guiding light reflected from a document toward the second scanning unit 113, as shown in FIG. 10.

The second scanning unit 113 moves at a speed of V/2 while following the first scanning unit 112. The second scanning unit 113 includes a second reflection mirror 152 and a third reflection mirror 153 which guide light reflected from the first reflection mirror 151 toward the image focusing lens 114 and the CCD 115.

The image focusing lens 114 causes light reflected from the third reflection mirror 153 to focus into an image on the CCD 115. The CCD 115 converts light from the image focusing lens 114 into an analog electric signal. The analog electric signal is converted into digital image data by the image processing apparatus 2a. Alternatively, the analog electric signal can be converted into digital image data by the image input apparatus 1.

The first reading section 110 reads not only a document placed on the first contact glass 111 but also an image on a document that is being carried by a member of the upper housing 102 as later described.

In a case where the first scanning unit 112 reads a document placed on the first contact glass 111, the first scanning unit 112 moves, by a predetermined distance, in a direction which is headed from a position of Pos 1 toward a position of Pos 2 (see FIG. 9) in accordance with a document size detected by the document size detecting sensor (document size detecting section) 170 (later described). In a case where the first scanning unit 112 reads a document that is being carried, the first scanning unit 112 stays still at a position of Pos 3 of FIG. 9. The first scanning unit 112 stays still, while standing by, at a position (home position) of Pos 0 (not shown) that is an intermediate position between the position of Pos 1 and the position of Pos 3 of FIG. 9.

As shown in FIG. 10, a document reference board 141 is provided at a front end of the first contact glass 111. The document reference board 141 shows indicators for indicating (i) the sizes of documents to be placed on the first contact glass 111 and (ii) directions in which the documents are to be placed on the first contact glass 111. The indicators allow a user to easily place a document on the first contact glass 111.

As described above, the upper housing 102 includes the second reading section 123. The second reading section 123 reads an image of a document placed on a document set tray (document feeder tray) 122. The second reading section 123 includes a document carrying section 131, an image sensor section (CIS: Contact Image Sensor) 132, a document conveying path 133, and a document discharging section 134.

The document carrying section 131 carries the document placed on the document set tray 122 in the document conveying path 133. The image sensor section 132 reads an image on an upper surface of the document which is being carried in the document conveying path 133 (an image on a surface of the document which surface faces the image sensor section 132). The document discharging section 134 discharges, to the paper output tray 103, the document whose image has been read by the image sensor section 132.

FIG. 10 is a view showing in detail a configuration of members provided in the vicinity of the document carrying section 131, the image sensor section 132 and the document discharging section 134.

As shown in FIGS. 9 and 10, the document carrying section 131 includes an auxiliary feeding roller 161, a document set detecting sensor 162, a document pressing board 163, a friction pad 164, a feeding timing sensor 165, a feeding roller 166, and a pair of alignment rollers 167.

The auxiliary feeding roller 161 and the document pressing board 163 take documents detected by the document set detecting sensor 162 into the second reading section 123. The friction pad 164, the feeding roller 166, and the pair of alignment rollers 167 guide, to the image sensor section 132, the documents one by one which have been taken into the second reading section 123, on the basis of a result detected by the feeding timing sensor 165.

The pair of alignment rollers 167 have a driving shaft with an electromagnetic clutch (not shown). The electromagnetic clutch can control transmission of a driving force from a driving motor (not shown). The pair of alignment rollers 167 stay still while no document is carried to the pair of alignment rollers 167. The pair of alignment rollers 167 are configured to rotate in a direction in which the document is carried downstream, in response to a predetermined signal which is transmitted from the feeding timing sensor 165 when the feeding timing sensor 165 contacts a front edge of the document.

Specifically, the pair of alignment rollers 167 do not rotate to carry the document downstream until (i) the front edge of the document carried downstream by the friction pad 164 and the feeding roller 166 contacts a nip part of the stationary pair of alignment rollers 167 and then (ii) predetermined bending of the document is formed. At that time, the nip part of the pair of alignment rollers 167 causes the front edge of the document to be perpendicular to the direction in which the document is carried. A space between the pair of alignment rollers 167 and the second contact glass 116 partially constitutes the document conveying path 133.

The document discharging section 134 includes a pair of document discharging rollers (offset rollers) 169 and a document discharging sensor 159. The pair of document discharging rollers 169 are made up of an upper roller that is a driving roller and a lower roller (a driven roller) rotatably provided in the lower housing 101. The upper roller is integrated with a left part of the upper housing 102, and is driven by a driving mechanism provided in the upper housing 102. The upper roller and the lower roller of the pair of document discharging rollers 169 carry the document which has passed in the document conveying path 133 while sandwiching it, and then discharge the document onto the paper output tray 103. The control section 5a controls, on the basis of a detection result of the separator sheet, the lower roller to shift so that the separator sheet is sorted.

The document discharging sensor 159 is provided downstream of the pair of document discharging rollers 169, and notifies the control section 5a of discharging of a document.

The following describes a document reading process carried out by the image input apparatus 1. In the static-sheet reading mode, merely a single-side reading function can be selected, and therefore merely the first reading section 110 is used to read a document. In reading the document, the first scanning unit 112 of the first reading section 110 is first disposed at the home position (between the position of Pos 3 and the position of Pos 1 of FIG. 9). Thereafter, in response to an instruction received from the control section 5a, the first scanning unit 112 moves toward the position of Pos 2 together with the second scanning unit 113 while scanning, from the position of Pos 1, the document placed on the first contact glass 111. This allows the CCD 115 to receive reflection light in accordance with an image of the document. The first reading section 110 reads an image of a stationary document which image is formed on a lower side (surface) of the stationary document.

According to the sheet-feed reading mode, the single-side reading function or a double-side reading function can be selected. In a case where a single side reading function is selected in the sheet-feed reading mode, merely the first reading section 110 is used to read a document. In a case where an instruction for selecting the single side reading function is entered, the first scanning unit 112 of the first reading section 110 moves from the home position to the position of Pos 3 and stays still there. The first scanning unit 112 reads a conveyed document while remaining stationary at the position of Pos 3. In response to the instruction received from the control section 5a, the CCD 115 reads, from below through the second contact glass 116, the image of the document which is being carried in the document conveying path 133. That is, the first reading section 110 reads an image of a document which image is formed on a lower side (surface) of the document.

In a case where the double-side reading function is selected in the sheet-feed reading mode, the first reading section 110 and the image sensor section 132 are used to read a document. In this case, the first scanning unit 112 of the first reading section 110 stays still at the position of Pos 3 of FIG. 9, as with the case where the single-side reading function is selected in the sheet-feed reading mode.

In response to the instruction received from the control section 5a, the first reading section 110 reads, from below through the second contact glass 116, the image of the document which is being carried in the document conveying path 133. Simultaneously, the image sensor section 132 reads, from above, the other image of the document which is being carried in the document conveying path 133, which other image is formed on an upper side (back side (rear side)) of the document.

In the double-side mode, the first reading section 110 and the image sensor section 132 of the image input apparatus 1 simultaneously read, from above and from below, the images formed on the double sides of the document which is being carried in the document conveying path 133.

The document set tray 122 includes a plurality of document size detecting sensors 170 at different positions aligned along a direction in which a document to be placed on the document set tray 122 is carried. The plurality of document size detecting sensors 170 detect a size of the document to be placed on the document set tray 122. Specifically, the size of the document is detected in accordance with (i) results detected by the plurality of document size detecting sensors 170 provided along the direction in which the document is carried and (ii) a position of a document regulatory guide for regulating the document along a width direction of the document.

In the present invention, the document is read in the sheet-feed reading mode. When the separating function is enabled, the double-side mode is automatically enabled.

(Document Shifter Mechanism)

Figure 11:
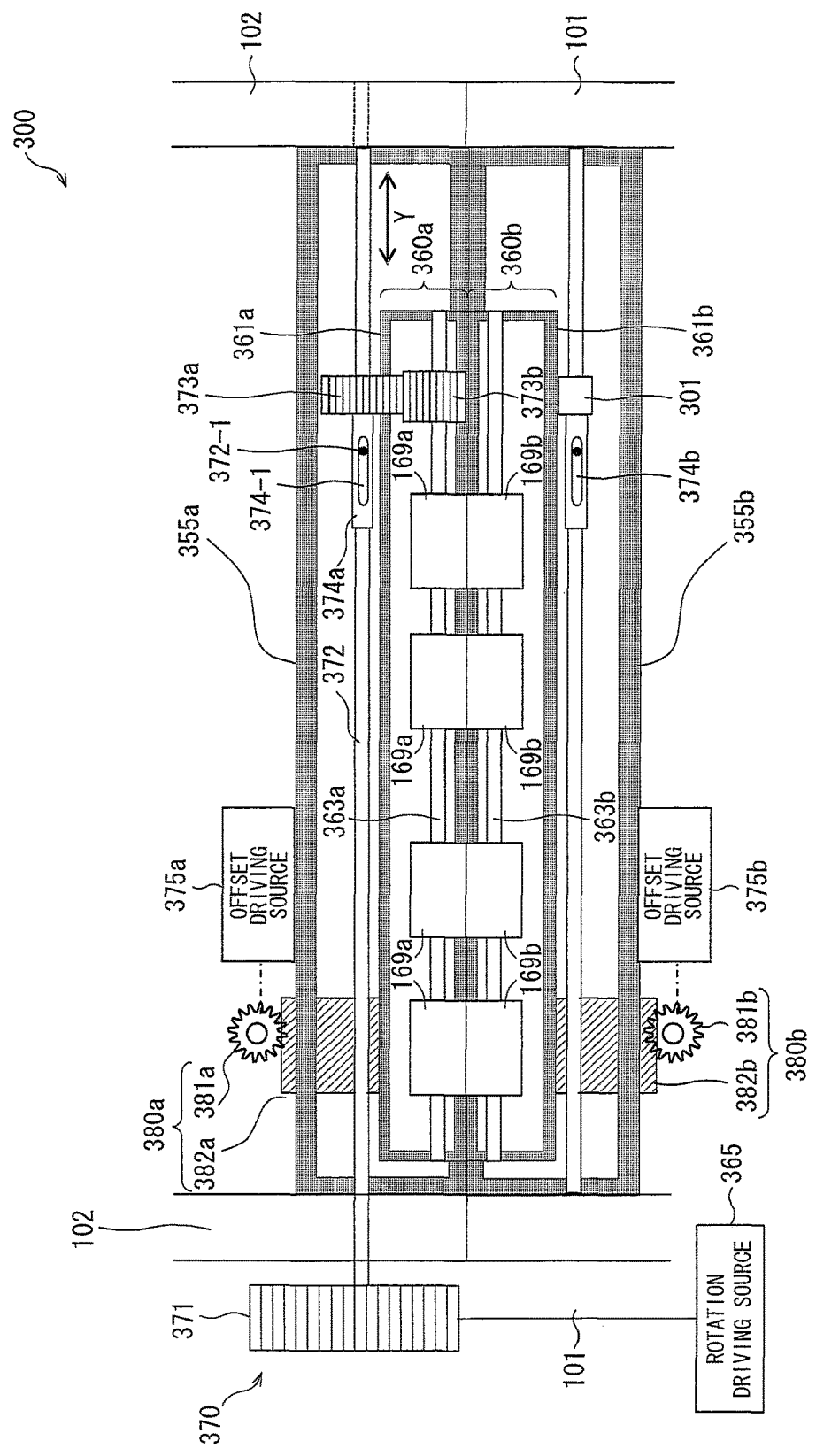
FIG. 11 is a view showing a configuration of a shifter mechanism.
Figure 12:
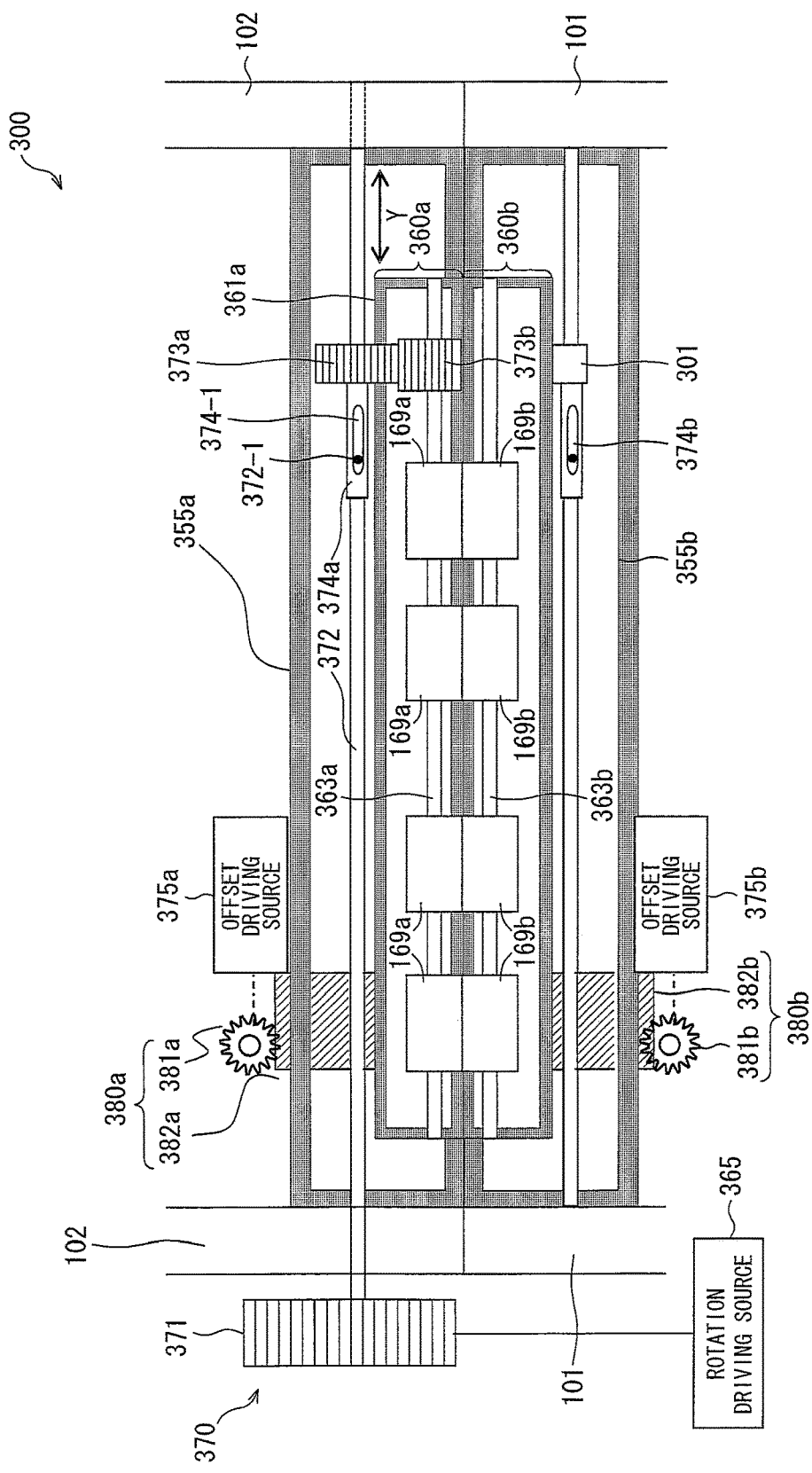
FIG. 12 is a view showing a configuration of a shifter mechanism.

The following describes, with reference to FIGS. 11 and 12, means by which the document shifter mechanism (document sorting section) sorts documents discharged from the image input apparatus 1. Sorting can be carried out by, for example, a mechanism disclosed in Patent Literature 7 (Japanese Patent Application Publication, Tokukai No. 2008-77641 A).

As described above, the image input apparatus 1 includes the pair of document discharging rollers 169 made up of (i) the upper roller (driving roller) provided in the upper housing 102 and (ii) the lower roller (driven roller) provided in the lower housing 101 (see FIG. 9). The upper roller (driving roller) and the lower roller (driven roller) of the pair of document discharging rollers 169 are offset rollers 169a and 169b (later described), respectively.

A document shifter mechanism 300 includes housings 355a and 355b, a rotation driving source 365, a driving transmission member 370, offset driving sources 375a and 375b, offset driving transmission members 380a and 380b, and other members. The document shifter mechanism 300 discharges a read document to the paper output tray.

The housing 355a is supported by the upper housing 102. The housing 355a includes an offset member 360a and the driving transmission member 370, and the offset driving source 375a and the offset driving transmission member 380a are provided outside the housing 355a. The housing 355b is supported by the lower housing 101. The housing 355b includes an offset member 360b, and the offset driving source 375b and the offset driving transmission member 380b are provided outside the housing 355b.

The offset member 360a includes a housing 361a, an offset roller 169a and other members. The offset member 360b includes a housing 361b, an offset roller 169b and other members. The offset rollers 169a and 169b make a pair (a pair of offset rollers 169). The offset members 360a and 360b move in the direction indicated by an arrow Y, for example, from a state shown in FIG. 11 to a state shown in FIG. 12. This causes a document to be offset-discharged. The offset rollers 169a and 169b are rotatably supported by the housings 361a and 361b, respectively, so as to discharge a paper in a direction in which the paper is carried. Specifically, a plurality of pairs of offset rollers 169 are supported by the housings 361a and 361b. The plurality of pairs of offset rollers 169 rotate and hold so as to discharge a paper to the paper output tray.

The rotation driving source 365 provides, to the offset rollers 169a, a driving force for rotating the offset rollers 169a. The driving transmission member 370 includes a driving gear 371, a shaft 372, connection gears 373a and 373b, and a sliding member 374a. The driving transmission member 370 transmits, to the offset rollers 169a, the driving force provided by the rotation driving source 365. The driving gear 371 is connected to the rotation driving source 365 so as to rotate the shaft 372 which is fitted in the driving gear 371.

In the upper housing 102 that is a frame of a main body of the image input apparatus 1, the shaft 372 is supported so as to rotate in a direction identical to a direction in which the offset rollers 169a rotate. The sliding member 374a is slidably supported by the shaft 372 which is fitted in the sliding member 374a. The offset member 360a is supported by the shaft 372, through the sliding member 374a and the connection gear 373a, so as to be movable in a direction perpendicular to the direction in which a document is carried. The shaft 372 includes a regulatory member 372-1 that projects from a hole 374-1 of the sliding member 374a so as to regulate a moving range of the connection gear 373a and the offset member 360a. The hole 374-1 is elongate in an axial direction of the shaft 372.

The connection gears 373a and 373b are provided in the offset member 360a of the housing 355a. The connection gear 373a projects from a hole of the housing 361a which hole is formed on a side of the shaft 372, and the sliding member 374a is fitted in the connection gear 373a. The connection gear 373a is supported so as to slide, together with the sliding member 374a, along the shaft 372 in the direction indicated by the arrow Y. The connection gear 373a, the sliding member 374a, and the shaft 372 integrally rotate. This is because rotation of the shaft 372 is transmitted to the connection gear 373a by the regulatory member 372-1 of the shaft 372. The support member 363a, that supports the offset rollers 169a that are ones of the respective pairs of offset rollers 169, is fitted in the connection gear 373b around an end of the support member 363a. The connection gear 373b rotates the offset rollers 169a through the support member 363a. The offset rollers 169b, that are the others of the respective pairs of offset rollers 169, are rotated by the rotation of the offset rollers 169a.

The offset driving source 375a is connected to the offset driving transmission member 380a, and provides, to the offset member 360a, a driving force for causing the offset member 360a to move in the direction indicated by the arrow Y. The offset driving transmission member 380a includes a pinion gear 381a, a rack gear 382a and other members. The pinion gear 381a is rotatably supported, and connected to the offset driving source 375a and the rack gear 382a. The pinion gear 381a is accordingly rotated by the offset driving source 375a. This causes the rack gear 382a to move in the direction indicated by the arrow Y. The rack gear 382a is provided on an upper part of the housing 361a and on a rear side of FIG. 11. The rack gear 382a moves the housing 361a in response to the movement of the pinion gear 381a in the direction indicated by the arrow Y. In this case, the connection gear 373a and the sliding member 374a move, together with the housing 361a, in the direction indicated by the arrow Y because a side surface of the connection gear 373a comes into contact with the housing 361a.

The offset member 360b of the housing 355b supported by the lower housing 101 is connected to the sliding member 374b through a locking member 301. The offset member 360b of the housing 355b is controlled to be moved, in the direction indicated by the arrow Y, by the offset driving source 375b and the offset driving transmission member 380b (including a pinion gear 381b and a rack gear 382b), as with the offset member 360a of the housing 355a. The offset driving sources 375a and 375b of the housings 355a and 355b are respectively controlled in synchronization with each other. This allows the offset rollers 169a and the offset rollers 169b to be simultaneously offset in the same direction. Where a document is discharged is controlled.

(Document Size Detection)

The following describes a method for detecting a document size. For example, the following method described in Patent Literature 8 (Japanese Patent Application Publication, Tokukai No. 2010-93406 A) can be employed as the method for detecting a document size.

As shown in FIG. 9, the document set tray 122 includes the plurality of document size detecting sensors 170 at different positions aligned along a direction in which a document to be placed on the document set tray 122 is carried. The plurality of document size detecting sensors 170 detect a size of the document to be placed on the document set tray 122. Specifically, the size of the document is detected in accordance with (i) results detected by the plurality of document size detecting sensors 170 provided along the direction in which the document is carried and (ii) a position of a document regulatory guide for regulating the document along a width direction of the document.

(Image Forming Apparatus)

Figure 13:
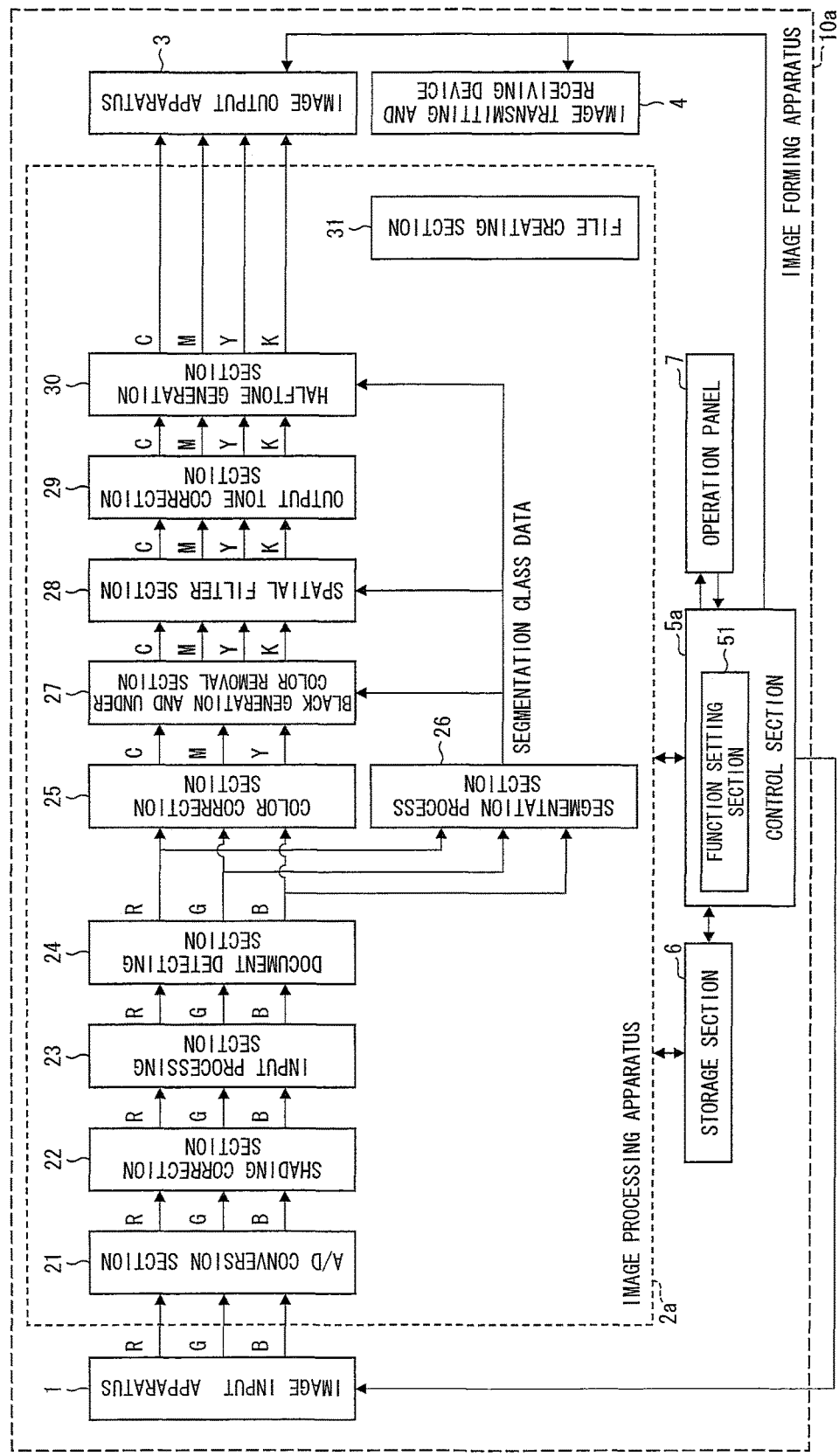
FIG. 13 is a block diagram showing an image forming apparatus in accordance with Embodiment 1, and a block diagram showing a flow of image data, which flow is obtained in a case where a print process is carried out with respect to the image data.

The following describes a case where an image forming apparatus of the present invention is applied to a copying machine or a multifunction peripheral, with reference to FIGS. 1 and 13.

Each of FIGS. 1 and 13 is a block diagram in which the image forming apparatus 10a is applied to a digital color image forming apparatus (a digital copying machine or a multifunction peripheral that includes functions such as a copy function, a print function, a fax function, and a scan to e-mail function).

The digital color image forming apparatus is assumed to be a multifunction peripheral (Multi Function Peripherals (MFP)) having a plurality of functions such as a copy function, a scan function, a print function, a fax function, and an image transmitting function. Note that the image transmitting function includes (i) a function of sending, by e-mail, image data which has been read and created by the scan function (scan to e-mail function) and (ii) a function of storing the image data in a USB memory (scan to USB). Note also that the functions of the image forming apparatus 10a are not limited to the above functions. The digital color image forming apparatus does not necessarily have all of the above functions. That is, the digital color image forming apparatus can have one or at least two of the above functions.

The following description will first explain means by which the image forming apparatus 10a carries out a print process, with reference to FIG. 13. FIG. 13 shows a flow of image data in the image forming apparatus 10a, which flow is obtained in a case where a print process is carried out in a copy mode and a full-color mode.

The image input apparatus 1 is constituted by a CCD (Charge Coupled Device) line sensor, and converts light reflected from a document into electric signals of R (red), G (green) and B (blue) color components.

The image input apparatus 1 supplies color image signals (R, G and B analog signals) to an A/D (analog-digital) converting section 21. The A/D conversion section 21 converts the color image signals into respective R, G, and B digital signals. Various distortions generated in an illumination system, an image focusing system, and an image sensing system of the image input apparatus 1 are removed from the R, G, and B digital signals by a shading correction section 22. Thereafter, an input processing section 23 carries out a process such as a γ correction with respect to the R, G and B digital signals from which the various distortions have been removed.

Data outputted from the input processing section 23 is supplied to the storage section 6. In a case where the separating function is enabled, the document detecting section 24 carries out a separator sheet detection and a blank page detection with respect to the image data stored in the storage section 6.

Note that the image data outputted from the input processing section 23 can be managed as filing data. In this case, the image data is compressed into a JPEG code on the basis of, for example, a JPEG compression algorithm, and is then stored in the storage section 6. In a case where a user instructs to copy or print, the JPEG code is read out from the storage section 6, is supplied to a JPEG extension section (not shown), and is then decoded in the JPEG extension section so as to be converted into RGB data.

In a case of the image transmitting process, the JPEG code is read out from the storage section 6, the image transmitting and receiving device 4 transmits data to an external connection apparatus or a communication line, through a network or another communication line. Note that the control section 5a controls a management of the filing data and supplying of the data.

The color correction section 25 creates C (cyan), M (magenta), and Y (yellow) signals that are complementary colors of R, G and B signals, and carries out a process for improving color reproducibility with respect to the C, M, and Y signals. The black generation and under color removal section 27 converts the C, M and Y signals into C, M, Y and K (black) signals. Thereafter, the C, M, Y and K signals are subjected to an edge enhancement process and/or a smoothness process in a spatial filter section 28, is then subjected to an output γ correction process in an output tone correction section 29 so that an image is printed onto a recording medium such as a paper. The halftone generation section 30 carries out a halftone reproduction process for outputting an image.

A segmentation process section 26 determines that each pixel of input image data belongs to which region such as a black text region, a color text region, a halftone dot region, or a region of a photograph (continuous tone image region). Segmentation class data outputted from the segmentation process section 26 is supplied to the black generation and under color removal section 27, the spatial filter section 28, and the halftone generation section 30 so as to be appropriately selected and subjected to processes suitable to the respective regions.

The C, M, Y and K signals outputted from the halftone generation section 30 are supplied to the image output apparatus 3 so that an output image is formed, i.e., so as to be subjected to a print process. In the case where the separating function is enabled, the print process is carried out for each of a plurality of bundle of documents. Note that the image output apparatus 3 is a printer, such as an electrophotographic printer or an inkjet printer, which reproduces an image.

The following describes means by which the image transmitting process is carried out by the image forming apparatus 10a, with reference to FIG. 1. FIG. 1 shows a flow of image data in the image forming apparatus 10a, which flow is obtained in a case where the image transmitting process is carried out in a full color mode.

In a case where the image forming apparatus 10a carries out a transmitting process in an image transmitting mode, the image input apparatus 1, the A/D (analog-digital) converting section 21, the shading correction section 22, the input processing section 23 and the segmentation process section 26 carry out respective processes identical to those carried out by the sections in the print process.

Note that the segmentation process section 26 outputs a segmentation class signal to the spatial filter section 28 and the output tone correction section 29.

The R, G, and B image data are converted, by the color correction section 25, into respective R', G', and B' image data (such as sRGB data) suitable for a display property of a generally available display device, and is then subjected to a spatial filter process (an edge enhancement process and/or a smoothness process), by use of a digital filter, in the spatial filter section 28 on the basis of the segmentation class signal. The output tone correction section 29, for example, carries out (i) a correction, in which a gamma curve of FIG. 17(*b*) is used, with respect to a text region so that texts in the text region are clearly displayed and (ii) a correction, in which a gamma curve of FIG. 17(*a*) is used, with respect to a region other than the text region. FIG. 17(*a*) shows a gamma curve corresponding to the display property of the generally available display device. FIG. 17(*b*) shows (i) a solid gamma curve for clearly displaying the texts and (ii) a dashed gamma curve that is the gamma curve of FIG. 17(*a*). The dashed gamma curve is shown in FIG. 17(*b*) for comparing with the solid gamma curve.

The black generation and under color removal section 27 does not carry out any process with respect to supplied image data, and therefore supplies the image data as it is to a subsequent block (the black generation and under color removal section 27 is skipped). Accordingly, the output tone correction section 29 outputs the R', G', and B' image data.

In a case where the input image data is binary image data or a user instructs the image forming apparatus 10a to output binary image data, the halftone generation section 30 carries out a binary process with respect to inputted image data. Meanwhile, in a case where the input image data is multi-leveled or a user does not instruct the image forming apparatus 10a to output binary image data, the halftone generation section 30 does not carry out any processes with respect to the image data.

The R', G', and B' image data or binary monochrome image data supplied from the halftone generation section 30 are each converted into, by the file creating section 31, a predetermined image file such a PDF file, a TIFF, or a JPEG. Such a predetermined image file is then attached to an e-mail by a mail processing section (job device) that is not shown in FIG. 1. The e-mail is sent to a target recipient by the image transmitting and receiving device 4, through a network.

[Embodiment 2]

Figure 14:
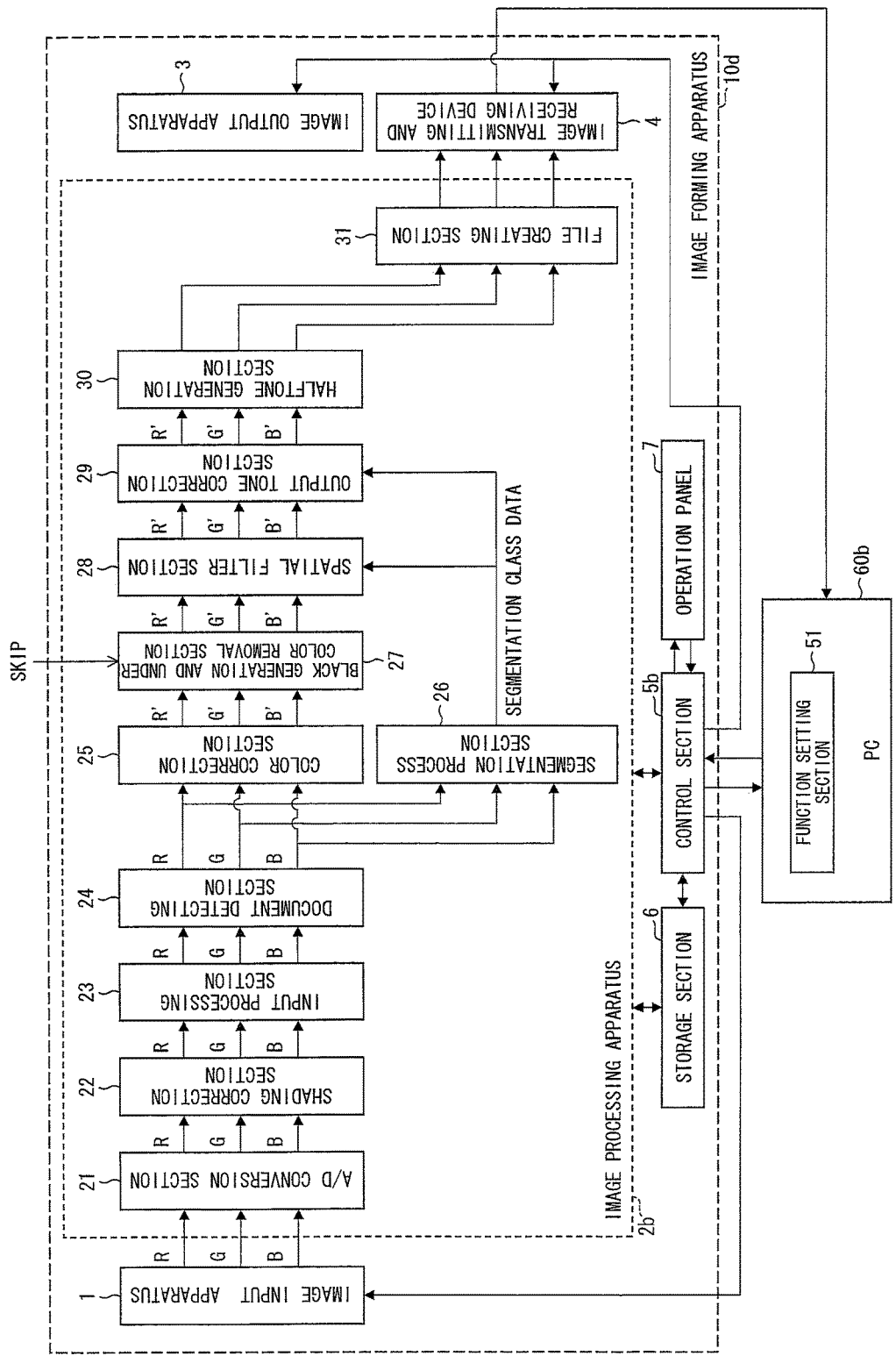
FIG. 14 is a block diagram showing an image forming apparatus in accordance with Embodiment 2, and a block diagram showing a flow of image data to be transmitted to an external apparatus according to a control carried out by the external apparatus, the image data having been subjected to a file creating process.

The following describes another embodiment of the control device of the present invention with reference to FIG. 14.

In Embodiment 2, a PC 60b functions as the control device of the present invention, and an image processing system to be controlled is an image forming apparatus 10b. Identical reference numerals are given to members having functions identical to Embodiment 1, and descriptions of such members are omitted here.

A control section 5b included in the image forming apparatus 10b is a block for collectively controlling operations of various configurations and operations of various functions in the image forming apparatus 10b. The control section 5b of Embodiment 2 is different from the control section 5a of Embodiment 1 in that the control section 5b communicates with the PC (computer) 60b that is an external device, and carries out various controls in accordance with an instruction received from the PC 60b. The PC 60b includes the function setting section 51 in Embodiment 2 though the control section 5a of the image forming apparatus 10a includes the function setting section 51 in Embodiment 1.

According to Embodiment 2, the PC 60b displays a user interface on the operation panel 7 through the control section 5b. The PC 60b receives an instruction entered by a user through the control section 5b. That is, under the PC 60b control, the image forming apparatus 10b operates in accordance with an instruction of the PC 60b.

The PC 60b can be provided in a place distant from a place where the image forming apparatus 10b is provided (for example, in a PC of a user or a server device). Alternatively, the PC 60b can be incorporated in the image forming apparatus 10b (For example, a PC box).

As described in Embodiment 2, in a case where the PC 60b is provided separately from the control section 5b of the image forming apparatus 10b so as to control the image forming apparatus 10b, it is possible to provide a high-performance image forming apparatus by means of software without modifying the hardware of the image forming apparatus. Specifically, the image forming apparatus has an additional function of carrying out an output process with respect to each of a plurality of bundles of documents by combining a double-side scanning function, a blank page skipping function, and a separating function.

[Embodiment 3]

Figure 15:
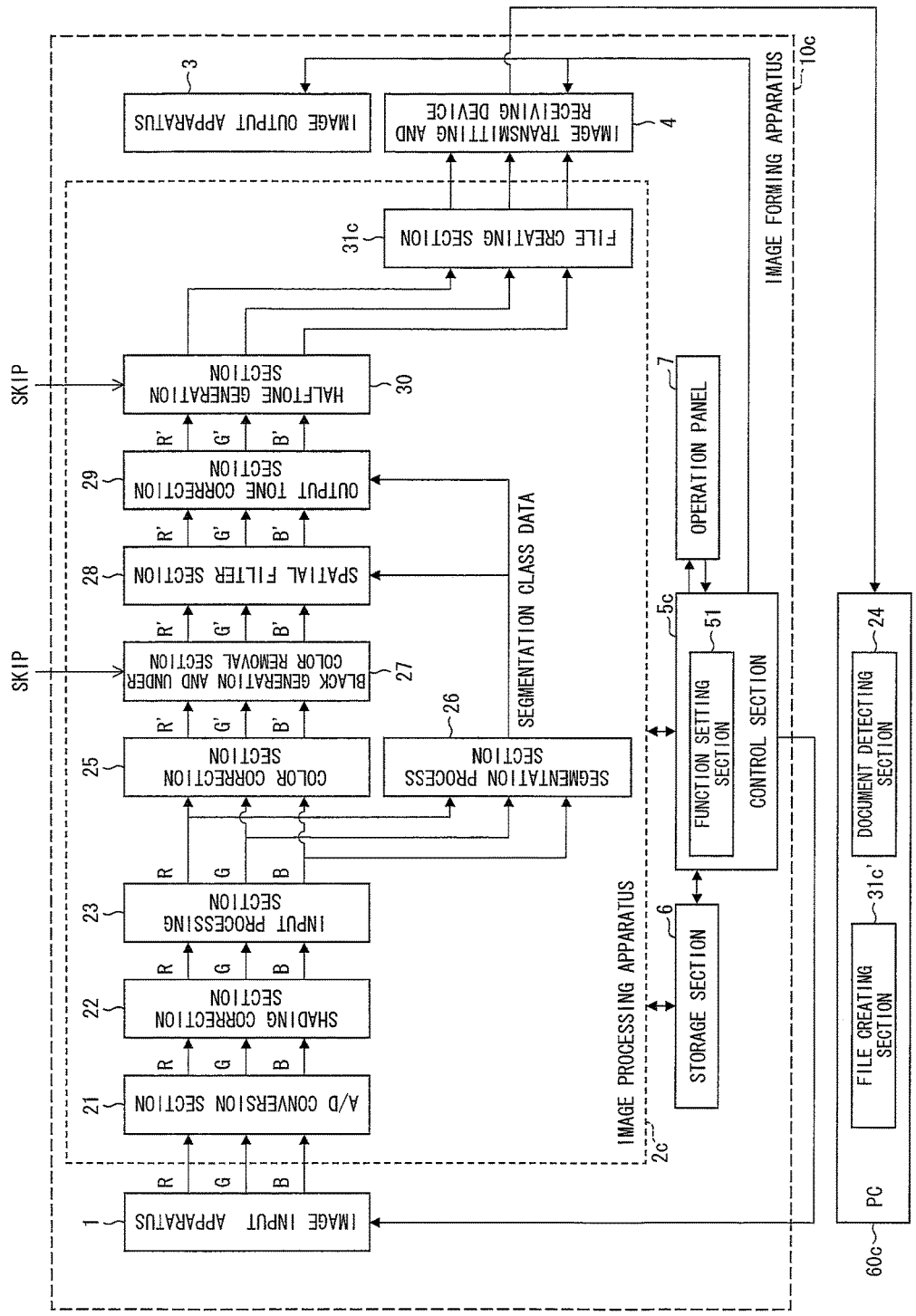
FIG. 15 is a block diagram showing an image forming apparatus in accordance with Embodiment 3 and an external apparatus, and a block diagram showing a flow of data on which the external apparatus carries out an output process.

The following describes yet another embodiment of the control device of the present invention with reference to FIG. 15.

In Embodiment 3, a control section 5c included in an image forming apparatus 10c functions as the control device of the present invention, and an image processing system to be controlled is (i) the image forming apparatus 10c and (ii) a PC (computer) 60c that is an external device. Identical reference numerals are given to members having functions identical to Embodiment 1, and descriptions of such members are omitted here.

The control section 5c of the image forming apparatus 10c is a block for collectively controlling operations of various configurations and operations of various functions in the image forming apparatus 10c.

The image forming apparatus 10c of Embodiment 3 does not include the document detecting section 24. The document detecting section 24 is included in the PC 60c. The PC 60c includes a file creating section 31c' which converts, into a file format (such as a PDF, a TIFF or a JPEG) specified by a user, image data processed by the document detecting section 24.

The file creating section 31c does not process image data for each of a plurality of bundles of documents but converts the image data into an image file, which is set in advance, such as a PDF file, a TIFF or a JPEG, while, for example, embedding into the image data a command or the like for instructing to carry out a separator sheet detection and a blank document detection. The image transmitting and receiving device 4 transmits, to the PC 60c, the image file supplied from the file creating section 31c. The document detecting section 24 of the PC 60c carries out the separator sheet detection and the blank document detection in response to the command. The file creating section 31c' of the PC 60c carries out a file creating process with respect to each of the plurality of bundles of documents in response to the command. The image forming apparatus 10c sorts each of the plurality of bundles of document into documents and separator sheets.

In a case where the separating function is enabled, the function setting function 51 sends, to the file creating section 31c, an instruction for embedding into image data the command for the separator sheet detection and the blank document detection.

According to Embodiment 3, it is possible to eliminate data of a blank document so as to carry out an output process with respect to each of the plurality of bundles of documents without missing any image data of information of the documents, even in a case where the image forming apparatus 10b has neither the separator sheet detecting function nor the blank document detecting function.

[Embodiment 4]

Figure 16:
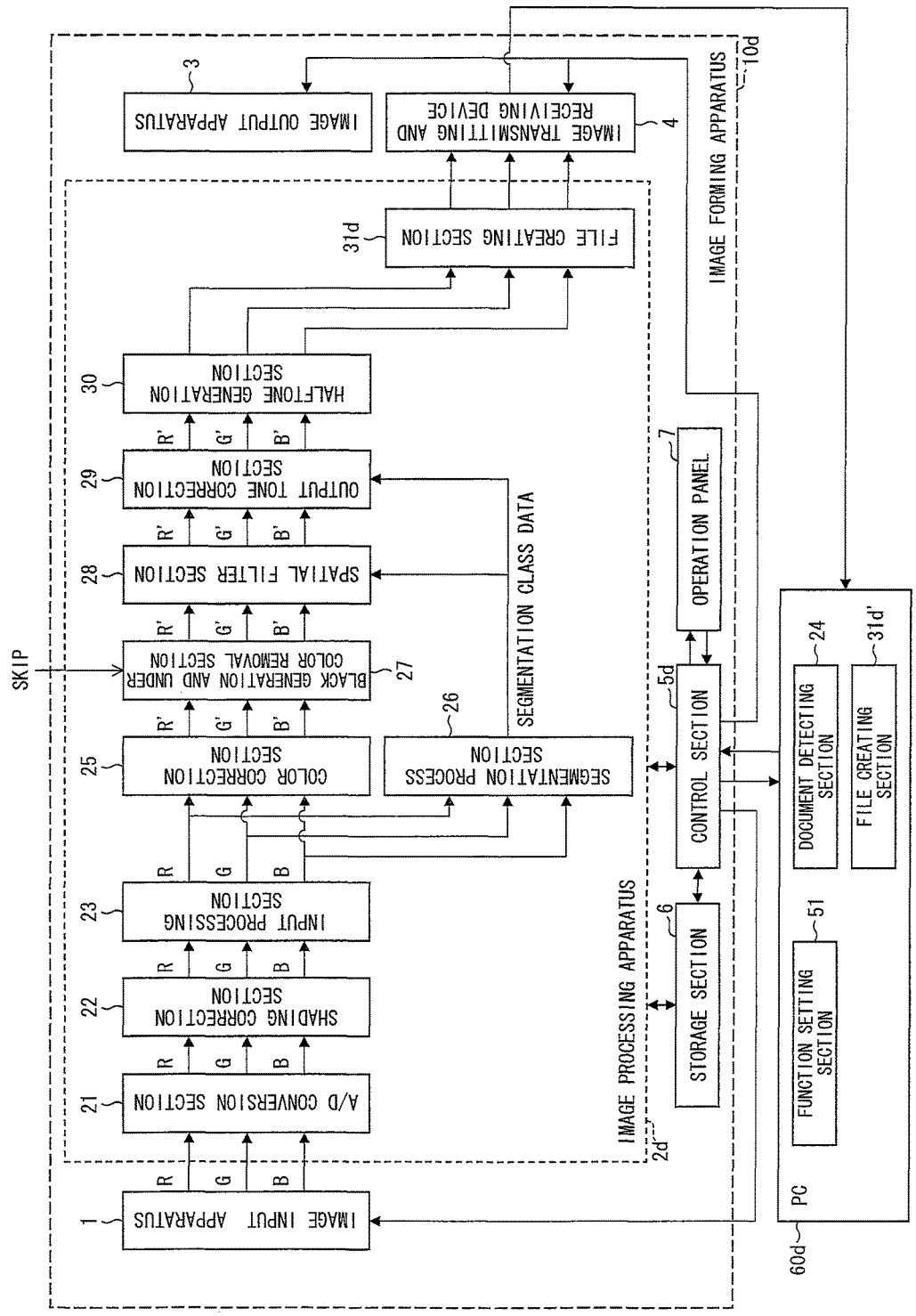
FIG. 16 is a block diagram showing an image forming apparatus in accordance with Embodiment 4 and an external apparatus, and a block diagram showing a flow of data on which the external apparatus carries out an output process.

The following describes a further embodiment of the control device of the present invention with reference to FIG. 16.

In Embodiment 4, a PC 60d functions as the control device of the present invention, and an image processing system to be controlled is (i) an image forming apparatus 10d and (ii) the PC 60d. Identical reference numerals are given to members having functions identical to Embodiment 1, and descriptions of such members are omitted here.

A control section 5d included in the image forming apparatus 10d is a block for collectively controlling operations of various configurations and operations of various functions in the image forming apparatus 10d. Note that the control section 5d of Embodiment 4 communicates with the PC (computer) 60d that is an external device, and carries out various controls in accordance with an instruction received from the PC 60d, as with the control device 5b of Embodiment 2.

The PC 60d of Embodiment 4 includes the function setting section 51 though the function setting section 51 is included in the control section 5a of the image forming apparatus 10a of Embodiment 1. The document detecting section 24 of Embodiment 4 is not included in the image forming apparatus 10d but included in the PC 60d. The PC 60d includes a file creating section 31d' which converts image data processed by the document detecting section 24 into a file format (such as a PDF, a TIFF or a JPEG) specified by a user.

As described above, the PC 60d of Embodiment 4 communicates with the control section 5d of the image forming apparatus 10d. Therefore, a file creating section 31d of the image forming apparatus 10d does not need to carry out the embedding of such a command, unlike Embodiment 3.

The file creating section 31d converts, into an image file (such as a TIFF, a JPEG or a PDF), image data which has not been subjected to the separating function or the blank page skipping function. The image file created by the file creating section 31d is sent to the PC 60d from the image transmitting and receiving device 4. In a case where the PC 60d receives the image file, (i) the document detecting section 24 of the PC 60d carries out the separator sheet detection and the blank page detection and (ii) the file creating section 31d' of the PC 60d creates an image file for each of a plurality of bundles of documents in the format specified by a user.

According to the PC 60d of Embodiment 4, the image file is created for each of the plurality of bundles of documents not by the file creating section 31d but by the file creating section 31d'.

According to Embodiment 4, the PC 60d displays a user interface on the operation panel 7 through the control section 5d. The PC 60d receives an instruction entered by a user through the control section 5d. That is, under the PC 60d control, and the image forming apparatus 10d operates in accordance with an instruction of the PC 60d.

The PC 60d carries out, with respect to the image forming apparatus 10d, the control which corresponds to an instruction out of instructions entered by a user and which is required for carrying out a document detection so that the image forming apparatus 10d transmits, to the PC 60d, image data read by the image input apparatus 1.

Embodiment 4 can bring about an effect identical to the effects which Embodiments 2 and 3 can bring about.

[Embodiment 5]

The present invention can be achieved by use of an image reading apparatus instead of using the image forming apparatus 10a, 10b, 10c or 10d. In a case where the image reading apparatus is used, it is necessary (i) for separator sheets to be added as an accessory to the image reading apparatus or (ii) the separator sheets should be printed in advance by an image forming apparatus.

For example, an operation panel of the image reading apparatus displays a screen on which there is no display related to printing (see FIG. 19(a)). Note that, in a case where (i) the image reading apparatus is controlled by a computer and (ii) an image forming apparatus (a printer or a multifunction peripheral) is connected to the computer, the operation panel displays a screen related to setting and operation of a separator sheet printing (see FIG. 19(b)), and then the image forming apparatus prints a separator sheet. In a case where a document size is detected when a bundle of documents is placed on the image reading apparatus, the operation panel can display the sheet size shown in FIG. 4(b) ("AUTO" is included in the sheet size as an option).

FIG. 18 shows a block diagram of an image reading apparatus 100. The image reading apparatus 100 of FIG. 18 is different from the image forming apparatus 10a of FIG. 1 in that neither black generation and under color removal section 27 nor image output apparatus 3 are not included. Further, processes carried out by respective sections (configurations) of the image reading apparatus 100 are identical to those carried by the sections of the image forming apparatus 10a. Therefore, descriptions of such processes are omitted here. In FIG. 18, the image reading apparatus 100 includes a control section 5e which functions as the control section of the present invention, and an image processing system to be controlled is the image reading apparatus 100.

Note that the present invention encompasses an image reading apparatus that includes neither black generation and under color removal section 25 nor image output apparatus 3 of any one of the image forming apparatuses of Embodiments 2 through 4.

[Embodiment 6]

Program and Recording Medium

As an embodiment of the present invention, the control sections 5a, 5c and 5e, and the PCs 60b and 60d can be realized by hardware logic or can be realized by software with use of a CPU as follows.

Each of the control sections 5a, 5c and 5e, and the PCs 60b and 60d includes a CPU (central processing unit), a ROM (read only memory), a RAM (random access memory), and a memory device (memory medium) such as a memory. The CPU executes instructions in control programs for realizing each function. The ROM contains the control programs. The RAM develops the control programs. The memory device stores the control programs and various data. The objective of the present invention can also be achieved, by mounting, to the control sections 5a, 5c and 5e, and the PCs 60b and 60d, a computer-readable recording medium that stores control program codes (executable program, intermediate code program or source program) for the control sections 5a, 5c and 5e, and the PCs 60b and 60d, serving as software for realizing the foregoing respective functions, so that the computer (or CPU or MPU) retrieves and executes the program codes stored in the recoding medium.

The recoding medium can be, for example, a tape, such as a magnetic tape or a cassette tape; a disk including (i) a magnetic disk such as a floppy (Registered Trademark) disk or a hard disk and (ii) an optical disk such as CD-ROM, MO, MD, DVD or CD-R; a card such as an IC card (memory card) or an optical card; or a semiconductor memory such as a mask ROM, EPROM, EEPROM or flash ROM.

Alternatively, the control sections 5a, 5c and 5e, and the PCs 60b and 60d can be arranged to be connectable to a communications network so that the program codes are delivered over the communications network. The communications network is not limited to a specific one, and therefore can be, for example, the Internet, an intranet, extranet, LAN, ISDN, VAN, CATV communications network, virtual dedicated network (virtual private network), telephone line network, mobile communications network or satellite communications network. The transfer medium which constitutes the communications network is not limited to a specific one, and therefore can be, for example, wired line such as IEEE 1394, USB, electric power line, cable TV line, telephone line or ADSL line; or wireless such as infrared radiation (IrDA, remote control), Bluetooth (Registered Trademark), 802.11 wireless, HDR, mobile telephone network, satellite line or terrestrial digital network. The present invention encompasses a carrier wave, in which computer data signal which is embodied by electronic transmission of the program codes, is embedded.

A control device of the present invention is a control device for controlling an image processing system, the image processing system including: an image input section, which (i) is capable of continuously reading documents from a plurality of bundles of documents which bundles are stacked so that an interleaving paper is placed between any adjacent ones of the plurality of bundles, each of which bundles is made up of at least one document and (ii) creates image data of each of read documents; a blank document determining section for determining whether or not the image data created by the image input section is blank document data; an interleaving paper detecting section for detecting image data of the interleaving paper from the image data created by the image input section; and an output section for carrying out an output process with respect to the image data created by the image input section, the image input section having a double-side reading function of reading double sides of each of the documents and then creating image data of each of the double sides, the output section having (i) a blank page skipping function of causing the blank document data determined by the blank document determining section not to be subjected to the output process and (ii) a separating function of carrying out the output process with respect to each image data of a bundle of documents separated by the image data of the interleaving paper detected by the interleaving paper detecting section, said control device including a function setting section for enabling the double-side reading function and the blank page skipping function when enabling the separating function.

The configuration makes it possible to carry out the output process with respect to each of the plurality of bundles of documents that are continuously read, while eliminating the data of the blank document, without any missing image data of the information of the documents, without the documents being set to be single-sided or double-sided, irrespective of documents of which each of the plurality of bundles is made up, and irrespective of single-sided documents, double-sided documents, and means by which the single-sided documents each having two faces are stacked in each of the plurality of bundles.

The control device of the present invention can be further configured such that in a case where the interleaving paper detecting section detects image data of an interleaving paper, the function setting section applies the separating function to image data of a bundle of documents read by the image input section after the interleaving paper is detected.

According to the configuration, the separating function, the double-side reading function and the blank page skipping function are enabled in a case where the separator sheet detecting section detects the image data of the interleaving paper. That is, the separating function, the double-side reading function, and the blank page skipping function are automatically enabled, even in a case where a user does not enter an instruction for enabling the separating function.

The control device of the present invention can be further configured such that the image processing system further includes a reception section for receiving an instruction entered by a user, and the function setting section enables the separating function in a case where the reception section receives a separating mode instruction for enabling the separating function.

According to the configuration, in a case where the reception section receives the separating mode instruction entered by the user, the separating function, the double-side reading function, and the blank page skipping function are enabled. As such, the separating function can be enabled by a user's determination.

The control device of the present invention can be further configured such that the image input section further has a single-side reading function of reading a single side of a document and then creating image data of the single side of the document, and the function setting section disables the double-side reading function and enables the single-side reading function, in a case where the reception section receives the separating mode instruction and a double-side reading function disabling instruction for disabling the double-side reading function.

According the configuration, in the case where the reception section receives the separating mode instruction, not only the separating function but also the double-side reading function and the blank page skipping function are enabled. In the case where the reception section further receives the double-side reading function disabling instruction for disabling the double-side reading function, the double-side reading function is disabled, in contrast, the single-side reading function is enabled. Therefore, for example, in a case where it is proven in advance that each of a plurality of bundles of documents is made up of merely single-sided documents which are not back to front (the front sides having information are not back to front), it is possible to eliminate a process of reading a side (back side (rear side)) of each document which side has no information by disabling the double-side reading function.

The control device of the present invention can be further configured such that the image processing system further includes a color discriminating section for discriminating whether the image data created by the image input section is monochrome image data or color image data, the output section has an output color determining function of (i) carrying out a monochrome output process with respect to image data which has been discriminated to be monochrome image data by the color discriminating section and (ii) carrying out a color output process with respect to image data which has been discriminated to be color image data by the color discriminating section, and the function setting section further enables the output color determining function when enabling the separating function.

According to the configuration, in the case where the separating function is enabled, not only the double-side reading function and the blank page skipping function but also the output color determining function is enabled. Therefore, in the case where the separating function is enabled, the documents are read and the image data of the documents is created while the double-side reading function is being enabled, and the output process is carried out with respect to the image data while the blank page skipping function, the separating function and the output color determining function are being enabled.

The control device of the present invention can be further configured such that the image processing system further includes a top-to-bottom determining section for determining a top-to-bottom direction of the image data created by the image input section, the output section further has a top-to-bottom direction correcting function of carrying out the output process with respect to the image data after correcting, based on a determination made by the top-to-bottom determining section, a top-to-bottom direction of the image data to a forward direction, and the function setting section further enables the top-to-bottom direction correcting function when enabling the separating function.

According to the configuration, in the case where the separating function is enabled, not only the double-side reading function and the blank page skipping function but also the top-to-bottom direction correcting function is enabled. Therefore, the documents are read and the image data of the documents is created while the double-side reading function is being enabled, and the output process is carried out with respect to the image data while the blank page skipping function, the separating function and the top-to-bottom direction correcting function are being enabled.

The control device of the present invention can be configured such that the output section is at least one of (i) a print section for printing the image data as the output process, (ii) a file creating section for creating a file of the image data as the output process or (iii) an image transmitting section for transmitting an image of the image data as the output process.

In a case where the output section is the print section for printing the image data as the output image process, the enabling of the separating function allows reading of the documents and creation of the image data of the documents while the double-side reading function is being enabled, and also allows a print process to be carried out with respect to the image data while the blank page skipping function and the separating function are being enabled. As such, it is possible to obtain printed materials which are processed for each of the plurality of bundles of documents from which a blank document(s) has(have) been eliminated.

In a case where the output section is the file creating section for creating the file of the image data (carrying out a file creating process with respect to the image data) as the output process, the enabling of the separating function allows reading of the documents and creation of the image data of the documents while the double-side reading function is being enabled, and also allows the file creating process to be carried out with respect to the image data while the blank page skipping function and the separating function are being enabled. As such, it is possible to (i) obtain sets of image data which are filed for each of the plurality of bundles of documents from which a blank document(s) has(have) been eliminated and then (ii) store the sets of image data in the storage section (to create filing data).

In a case where the output section is the image transmitting section for transmitting the image of the image data (carrying out an image data transmitting process with respect to the image data) as the output process, the enabling of the separating function allows reading of the documents and creation of the image data of the documents while the double-side reading function is being enabled, and also allows the image transmitting process to be carried out with respect to the image data while the blank page skipping function and the separating function are being enabled. As such, it is possible to transmit image sets of data which are filed for each of the plurality of bundles of documents from which a blank document(s) has(have) been eliminated.

In order to obtain the object, an image forming apparatus of the present invention includes the above-described control device and the above-described image input section.

According to the configuration, it is possible to provide an image forming apparatus capable of carrying out the output process with respect to each of the plurality of bundles of documents that are continuously read, while eliminating the data of the blank document, without any missing image data of the information of the documents, without carrying out a setting such as a setting for single-sided documents or a setting for double-sided documents, irrespective of documents of which each of the plurality of bundles is made up, and irrespective of single-sided documents, double-sided documents, and means by which the single-sided documents each having two faces are stacked in each of the plurality of bundles. Note that the output process carried out in the image forming apparatus can be the print process, the file creating process or the image transmitting process.

The image forming apparatus of the present invention can further include: a reception section for receiving an instruction entered by a user; and an interleaving paper output section for outputting a sheet on which an identifier that the interleaving paper detecting section can detect as image data of an interleaving paper is printed.

According to the configuration, the interleaving paper output section outputs the interleaving paper by which the plurality of bundles of documents are separated. The interleaving paper can be detected as the image data of the interleaving paper by the interleaving paper detecting section. It is accordingly possible to enable the separating function even in a case where a user does not prepare the interleaving paper in advance.

The image forming apparatus of the present invention can be further configured such that the image input section includes a document feeder tray on which the plurality of bundles of documents are to be placed, and a document size detecting section for detecting a size of each of the documents in the plurality of bundles of documents placed on the document feeder tray, and the interleaving paper output section outputs a sheet whose size is identical to the size detected by the document size detecting section, on which sheet the identifier is printed.

According to the configuration, detecting the size of each of the documents by the document size detecting section makes it possible to output an interleaving paper having a size corresponding to that of the document. This allows a user to obtain the interleaving paper having the size corresponding to that of the document without entering an instruction on the size of the interleaving paper. An interleaving paper having a size identical to that of a document brings an effect of preventing paper jam that possibly occurs during reading of the documents.

The image forming apparatus of the present invention can be further configured such that the interleaving paper output section prints the identifier on double sides of the sheet.

According to the configuration, it is possible to use an interleaving paper on both sides of which the identifier is printed. This makes it possible to, in a case where both sides of an interleaving paper are read, eliminate an influence of identifying the identifier on the other side of the interleaving paper though the identifier is provided merely on one side of the interleaving paper. It is also possible to sandwich the interleaving paper among the plurality of bundles of documents regardless of back and front sides of the interleaving paper.

The image forming apparatus of the present invention can be further configured such that in a case where the interleaving paper output section prints the identifier on a single side of the sheet, the control device changes, to be greater, a threshold on the basis of which the blank document determining section determines.

According to the configuration, the interleaving paper output section prints the identifier on the single side of the sheet. It is accordingly apparent to use the interleaving paper on the single side of which the identifier is printed. The control device therefore changes, to be greater, the threshold on the basis of which the blank document determining section determines. Changing the threshold to be greater makes it possible to prevent an influence of identifying the identifier on the other side of the sheet though the identifier is provided merely on the single side of the sheet. That is, in a case where an interleaving paper on one side of which the identifier is printed is used, the other side (back side (rear side)) of the interleaving paper on which the other side the identifier is not printed can be properly determined to be a blank document.

The image forming apparatus of the present invention can further include a document sorting section for (i) sorting the plurality of bundles of documents which have been read by the image input section into the bundles of documents and the interleaving papers and then (ii) discharging sorted bundles of documents and sorted interleaving papers.

According to the configuration, it is possible to sort the plurality of bundles of documents which have been read by the image input section into the bundles of documents and the interleaving papers, and then discharge the sorted bundles of documents and the sorted interleaving papers. The documents of the plurality of bundles of documents are discharged to an identical place, and the interleaving papers are discharged to a place other than the place to which the plurality of bundles of documents are discharged. This avoids the trouble of having to remove the interleaving papers from the plurality of bundles of documents.

In order to attain the object, an image reading apparatus of the present invention includes the above-described control device and the above-described image input section.

According to the configuration, it is possible to provide an image reading apparatus capable of carrying out the output process with respect to each of the plurality of bundles of documents that are continuously read, while eliminating the data of the blank document, without any missing image data of the information of the documents, without carrying out a setting such as a setting for single-sided documents or a setting for double-sided documents, irrespective of documents of which each of the plurality of bundles is made up, and irrespective of single-sided documents, double-sided documents, and means by which the single-sided documents each having two faces are stacked in each of the plurality of bundles. Note that the output process carried out in the image reading apparatus can be the file creating process or the image transmitting process.

The image reading device of the present invention can further include a document sorting section for (i) sorting the plurality of bundles of documents which have been read by the image input section into the bundles of documents and the interleaving papers and then (ii) discharging sorted bundles of documents and sorted interleaving papers.

According to the configuration, it is possible to sort the plurality of bundles of documents which have been read by the image input section into the bundles of documents and the interleaving papers, and then discharge the sorted bundles of documents and the sorted interleaving papers. The documents of the plurality of bundles of documents are discharged to an identical place, and the interleaving papers are discharged to a place other than the place to which the plurality of bundles of documents are discharged. This avoids the trouble of having to remove the interleaving papers from the plurality of bundles of documents.

A control method of the present invention is a control method for controlling an image processing system, the image processing system including: an image input section, which (i) is capable of continuously reading documents from a plurality of bundles of documents which bundles are stacked so that an interleaving paper is placed between any adjacent ones of the plurality of bundles, each of which bundles is made up of at least one document and (ii) creates image data of each of read documents; a blank document determining section for determining whether or not the image data created by the image input section is blank document data; an interleaving paper detecting section for detecting image data of the interleaving paper from the image data created by the image input section; and an output section for carrying out an output process with respect to the image data created by the image input section, the image input section having a double-side reading function of reading double sides of each of the documents and then creating image data of each of the double sides, the output section having (i) a blank page skipping function of causing the blank document data determined by the blank document determining section not to be subjected to the output process and (ii) a separating function of carrying out the output process with respect to each image data of a bundle of documents separated by the image data of the interleaving paper detected by the interleaving paper detecting section, said control method including the step of enabling the double-side reading function and the blank page skipping function when enabling the separating function.

As with the control device, the control method makes it possible to carry out the output process with respect to each of the plurality of bundles of documents that are continuously read, while eliminating the data of the blank document, without any missing image data of the information of the documents, without carrying out a setting such as a setting for single-sided documents or a setting for double-sided documents, irrespective of documents of which each of the plurality of bundles is made up, and irrespective of single-sided documents, double-sided documents, and means by which the single-sided documents each having two faces are stacked in each of the plurality of bundles.

The control device of the present invention can be realized by a computer. In this case, the computer is caused to serves as the function setting section of the control device. This allows the present invention to encompass a control program for causing the control device to be realized by use of the computer, and a computer-readable recording medium in which the control program is stored.

According to these configurations, an effect identical to that brought by the image processing apparatus can be brought by causing the computer to read and execute an image process program.

The present invention is not limited to the description of the embodiments above, and can therefore be modified by a skilled person in the art within the scope of the claims. Namely, an embodiment derived from a proper combination of technical means disclosed in different embodiments is encompassed in the technical scope of the present invention.

INDUSTRIAL APPLICABILITY

The present invention is applicable to, for example, a control device for controlling an image processing system that (a) detects interleaving papers from a plurality of bundles of documents, each of which bundles is made up of at least one document and which bundles are stacked so that an interleaving paper is placed between any two adjacent ones of the plurality of bundles and (b) carries out an output process with respect to each of the bundles of documents.

REFERENCE SIGNS LIST

1: image input apparatus (image input section)
2a, 2b, 2c and 2d: image processing apparatus
3: image output apparatus (output section, print section and interleaving paper output section)
4: image transmitting and receiving device (output section and image transmitting section)
5a, 5c and 5e: control section (control device)
5b and 5d: control section
6: storage section
7: operation panel (reception section)
10a, 10b, 10c and 10d: image forming apparatus (image forming system)
31: file creating section (output section)
60a: PC
60b: PC (control device)
60c: PC (image forming system)
60d: PC (control device and image forming system)
24: document detecting section
31, 31c' and 31d': file creating section (output section)
51: function setting section
100: image reading apparatus (image forming system)
122: document set tray (document feeder tray)
170: document size detecting sensor (document size detecting section)
244: separator sheet detecting section (interleaving paper detecting section)

245: blank page detecting section (blank document determining section)
300: document shifter mechanism (document sorting section)

The invention claimed is:

1. A control device for controlling an image processing system, the image processing system comprising:
an image input section, which (i) is capable of continuously reading documents from a plurality of bundles of documents which bundles are stacked so that an interleaving paper is placed between any adjacent ones of the plurality of bundles, each of which bundles is made up of at least one document and (ii) creates image
data of each of read documents;
an interleaving paper detecting section for detecting image data of the interleaving paper from the image data created by the image input section; and
an output section for carrying out an output process with respect to the image data created by the image input section,
the image input section having a double-side reading function of reading double sides of each of the documents and then creating image data of each of the double sides,
the output section having a separating function of carrying out the output process with respect to each image data of a bundle of documents separated by the image data of the interleaving paper detected by the interleaving paper detecting section,
said control device comprising a function setting section for enabling the double-side reading function in a case where the interleaving paper detecting section detects image data of the interleaving paper,
wherein the double-side reading function is automatically enabled, even in a case where a user does not enter an instruction for enabling the separating function,
the image processing system further comprises a top-to-bottom determining section for determining a top-to-bottom direction of the image data created by the image input section,
the output section further has a top-to-bottom direction correcting function of carrying out the output process with respect to the image data after correcting, based on a determination made by the top-to-bottom determining section, a top-to bottom direction of the image data to a forward direction, and
the function setting section further enables the top-to-bottom direction correcting function when enabling the separating function,
wherein when the function setting section enables the top to bottom correcting function, the separating function is also enabled.

2. The control device as set forth in claim 1, wherein:
in a case where the interleaving paper detecting section detects image data of an interleaving paper, the function setting section enables the separating function with respect to image data of a bundle of documents read by the image input section after the interleaving paper is detected.

3. The control device as set forth in claim 1, wherein:
the image processing system further comprises a reception section for receiving an instruction entered by a user, and the function setting section enables the separating function in a case where the reception section receives a separating mode instruction for enabling the separating function.

4. The control section as set forth in claim 3, wherein:
the image input section further has a single-side reading function of reading a single side of a document and then creating image data of the single side of the document, and
the function setting section disables the double-side reading function and enables the single-side reading function, in a case where the reception section receives the separating mode instruction and a double-side reading function disabling instruction for disabling the double-side reading function.

5. The control device as set forth in claim 1, wherein:
the image processing system further comprises a color discriminating section for discriminating whether the image data created by the image input section is monochrome image data or color image data,
the output section has an output color determining function of (i) carrying out a monochrome output process with respect to image data which has been discriminated to be monochrome image data by the color discriminating section and (ii) carrying out a color output process with respect to image data which has been discriminated to be color image data by the color discriminating section, and
the function setting section further enables the output color determining function when enabling the separating function.

6. The control device as set forth in claim 1, wherein the output section is at least one of (i) a print section for printing the image data as the output process, (ii) a file creating section for creating a file of the image data as the output process or (iii) an image transmitting section for transmitting an image of the image data as the output process.

7. An image forming apparatus comprising:
an image processing system comprising:
an image input section, which (i) is capable of continuously reading documents from a plurality of bundles of documents which bundles are stacked so that an interleaving paper is placed between any adjacent ones of the plurality of bundles, each of which bundles is made up of at least one document and (ii) creates image data of each of read documents;
an interleaving paper detecting section for detecting image data of the interleaving paper from the image data created by the image input section; and
an output section for carrying out an output process with respect to the image data created by the image input section,
the image input section having a double-side reading function of reading double sides of each of the documents and then creating image data of each of the double sides,
the output section having a separating function of carrying out the output process with respect to each image data of a bundle of documents separated by the image data of the interleaving paper detected by the interleaving paper detecting section, and
a control device comprising a function setting section for enabling the double-side reading function in a case where the interleaving paper detecting section detects image data of the interleaving paper, wherein the double-side reading function is automatically enabled, even in a case where a user does not enter an instruction for enabling the separating function, the image processing system further comprises a top-to-bottom determining section for determining a top-to-bottom direction of the image data created by the image input section, the output section further has a top-to-bottom direction correcting function of carrying out the output process with respect to the image data after correcting, based on a determination made by the top-to-bottom determining section, a top-to bottom direction of the image data to a forward direction, and the function setting section further enables the top-to-bottom direction correcting function when enabling the separating function, wherein when the function setting section enables the top to bottom correcting function, the separating function is also enabled.

8. The image forming apparatus as set forth in claim 7, further comprising:

a reception section for receiving an instruction entered by a user; and an interleaving paper output section for outputting a sheet on which an identifier that the interleaving paper detecting section can detect as image data of an interleaving paper is printed.

9. The image forming apparatus as set forth in claim 8, wherein:

the image input section includes a document feeder tray on which the plurality of bundles of documents are to be placed, and a document size detecting section for detecting a size of each of the documents in the plurality of bundles of documents placed on the document feeder tray, and the interleaving paper output section outputs a sheet whose size is identical to the size detected by the document size detecting section, on which sheet the identifier is printed.

10. The image forming apparatus as set forth in claim 8, wherein:

the interleaving paper output section prints the identifier on double sides of the sheet.

11. The image forming apparatus as set forth in claim 7, further comprising a document sorting section for (i) sorting the plurality of bundles of documents which have been read by the image input section into the bundles of documents and the interleaving papers and then (ii) discharging sorted bundles of documents and sorted interleaving papers.

12. An image reading apparatus comprising:
an image processing system comprising:
an image input section, which (i) is capable of continuously reading documents from a plurality of bundles of documents which bundles are stacked so that an interleaving paper is placed between any adjacent ones of the plurality of bundles, each of which bundles is made up of at least one document and (ii) creates image data of each of read documents;
an interleaving paper detecting section for detecting image data of the interleaving paper from the image data created by the image input section; and
an output section for carrying out an output process with respect to the image data created by the image input section, the image input section having a double-side reading function of reading double sides of each of the documents and then creating image data of each of the double sides, the output section having a separating function of carrying out the output process with respect to each image data of a bundle of documents separated by the image data of the interleaving paper detected by the interleaving paper detecting section, and a control device comprising a function setting section for enabling the double-side reading function in a case where the interleaving paper detecting section detects image data of the interleaving paper, wherein the double-side reading function is automatically enabled, even in a case where a user does not enter an instruction for enabling the separating function, the image processing system further comprises a top-to-bottom determining section for determining a top-to-bottom direction of the image data created by the image input section, the output section further has a top-to-bottom direction correcting function of carrying out the output process with respect to the image data after correcting, based on a determination made by the top-to-bottom determining section, a top-to bottom direction of the image data to a forward direction, and the function setting section further enables the top-to-bottom direction correcting function when enabling the separating function, wherein when the function setting section enables the top to bottom correcting function, the separating function is also enabled.

13. The image reading apparatus as set forth in claim 12, further comprising a document sorting section for (i) sorting the plurality of bundles of documents which have been read by the image input section into the bundles of documents and the interleaving papers and then (ii) discharging sorted bundles of documents and sorted interleaving papers.

14. A control method for controlling an image processing system, the image processing system comprising:
an image input section, which (i) is capable of continuously reading documents from a plurality of bundles of documents which bundles are stacked so that an interleaving paper is placed between any adjacent ones of the plurality of bundles, each of which bundles is made up of at least one document and (ii) creates image data of each of read documents;
an interleaving paper detecting section for detecting image data of the interleaving paper from the image data created by the image input section; and
an output section for carrying out an output process with respect to the image data created by the image input section, the image input section having a double-side reading function of reading double sides of each of the documents and then creating image data of each of the double sides, the output section having a separating function of carrying out the output process with respect to each image data of a bundle of documents separated by the image data of the interleaving paper detected by the interleaving paper detecting section, said control method comprising the step of enabling the double-side reading function in a case where the interleaving paper detecting section detects image data of the interleaving paper, wherein the double-side reading function is automatically enabled, even in a case where a user does not enter an instruction for enabling the separating function, the image processing system further comprises:

a top-to-bottom determining section for determining a top-to-bottom direction of the image data created by the image input section, the output section further has a top-to-bottom direction correcting function of carrying out the output process with respect to the image data after correcting, based on a determination made by the top-to-bottom determining section, a top-to bottom direction of the image data to a forward direction, and a function setting section that further enables the top-to-bottom direction correcting function when enabling the separating function, wherein when the function setting section enables the top to bottom correcting function, the separating function is also enabled.

15. A non-transitory computer-readable recording medium in which a control program for (i) causing a control device recited in claim 1 to operate and (ii) causing a computer to function as a function setting section of the control device is stored.

\* \* \* \* \*